(12) United States Patent
Suryavanshi

(10) Patent No.: US 9,055,043 B2
(45) Date of Patent: Jun. 9, 2015

(54) ADAPTIVE MEDIA SHARING

(71) Applicant: QUALCOMM Incorporated, San Diego, CA (US)

(72) Inventor: Vijay A. Suryavanshi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 13/658,586

(22) Filed: Oct. 23, 2012

(65) Prior Publication Data

US 2013/0124691 A1     May 16, 2013

Related U.S. Application Data

(60) Provisional application No. 61/558,119, filed on Nov. 10, 2011.

(51) Int. Cl.
    *G06F 15/16*      (2006.01)
    *H04L 29/08*      (2006.01)
    *H04L 12/58*      (2006.01)

(52) U.S. Cl.
    CPC .............. *H04L 67/06* (2013.01); *H04L 51/10* (2013.01); *H04L 51/38* (2013.01); *H04L 67/2823* (2013.01); *H04L 67/303* (2013.01); *H04L 67/26* (2013.01); *H04L 67/02* (2013.01); *H04L 51/066* (2013.01)

(58) Field of Classification Search
    CPC .......................... H04L 29/06; H04L 29/08072
    USPC ................................. 709/203, 220, 225, 228
    See application file for complete search history.

(56) References Cited

U.S. PATENT DOCUMENTS

| | | | |
|---|---|---|---|
| 6,529,956 B1 | 3/2003 | Smith et al. | |
| 7,490,126 B2 * | 2/2009 | Ozzie et al. | ................... 709/205 |
| 7,624,188 B2 | 11/2009 | Koskelainen | |

(Continued)

FOREIGN PATENT DOCUMENTS

| | | |
|---|---|---|
| EP | 0869652 A2 | 10/1998 |
| EP | 1164765 A2 | 12/2001 |
| WO | 2007004086 A1 | 1/2007 |

OTHER PUBLICATIONS

International Search Report and Written Opinion—PCT/US2012/062606—ISA/EPO—Aug. 5, 2013.

(Continued)

*Primary Examiner* — Khanh Dinh
(74) *Attorney, Agent, or Firm* — Raphael Freiwirth

(57) ABSTRACT

Systems, methods, and devices are provided that enable adaptive media sharing among a group of communication devices. In one embodiment, unique URLs may be associated with each version of a media payload provided to a group of devices. In another embodiment, media payloads may be transcoded and a unique URL may be associated with each transcoded version of the media payload provided to a group of devices. In another embodiment, a determination about a most active of a user's devices may be used in sharing the media with a user associated with a plurality of devices. In another embodiment, a determination about a cost of downloading may facilitate the sharing of media with a user associated with a plurality of devices. In another embodiment, a determination about link quality may facilitate the sharing of media with a user associated with a plurality of devices.

83 Claims, 16 Drawing Sheets

(56) References Cited

U.S. PATENT DOCUMENTS

| | | | |
|---|---|---|---|
| 8,024,404 B2 * | 9/2011 | Ozzie et al. | 709/205 |
| 2002/0016818 A1 * | 2/2002 | Kirani et al. | 709/203 |
| 2003/0097410 A1 | 5/2003 | Atkins et al. | |
| 2006/0030347 A1 | 2/2006 | Biswaas | |
| 2008/0318610 A1 | 12/2008 | Bhaskaran et al. | |
| 2009/0156181 A1 | 6/2009 | Athsani et al. | |
| 2010/0063989 A1 | 3/2010 | Mehta et al. | |

OTHER PUBLICATIONS

Partial International Search Report and Written Opinion—PCT/US2012/062606—ISA/EPO—Apr. 2, 2013.

* cited by examiner

ADAPTIVE MEDIA SHARING

RELATED APPLICATIONS

This application claims the benefit of priority to U.S. Provisional Patent Application No. 61/558,119 entitled "Adaptive Media Sharing" filed Nov. 10, 2011, the entire contents of which are hereby incorporated by reference.

FIELD

The present invention relates generally to media sharing among communication devices and more particularly to methods and systems for adaptive media sharing among groups of communication devices in a push-to-share type system.

BACKGROUND

Mobile devices may allow the sharing of media between users and groups of users over wireless communication networks. Users may share media, such as pictures, audio clips, video clips, and voice mail messages. Media may be shared among users and among different mobile devices. One method for sharing media that may be implemented in push-to-talk networks is known as push-to-share services which may allow quick one-to-one or one-to-many communication. In bandwidth-scarce networks, such push-to-share services may be attractive because they may deliver media in a timely manner and appropriate format while minimizing the bandwidth utilized in the process. In most push-to-share situations when particular media is shared it must be re-uploaded multiple times. As recipients then share the media further the media must be uploaded multiple times, placing demands on scarce bandwidth.

Additionally, different mobile devices may have different capabilities for presenting or using media, including different display capabilities and different media format support capabilities. Each intended recipient mobile device in a communication group may not have the same capability, and network resources may be unnecessarily taxed by providing unusable media to some mobile devices.

Additionally, an individual recipient may have multiple mobile devices for accessing shared media, but may only be actively using one mobile device at a given time. Each mobile device may receive the shared media, even though the user may only actively be using one mobile device. The provisioning of media to all of a recipient's mobile devices independent of current and historical recipient activity may unnecessarily utilize scarce network resources.

SUMMARY

The systems, methods, and devices of the various embodiments enable media sharing among a group of communication devices in a communication system. The various embodiments leverage the capabilities of servers and unique Uniform Resource Locators (URLs) to facilitate the sharing of media among groups of devices. In one embodiment, unique URLs may be associated with each version of a media payload provided to a group of devices. In another embodiment, media payloads may be transcoded and a unique URL may be associated with each transcoded version of the media payload provided to a group of devices. In another embodiment, a determination about a most active of a user's devices may facilitate the sharing of media with a user associated with a plurality of devices. In another embodiment, a determination about a cost of downloading may facilitate the sharing of media with a user associated with a plurality of devices. In another embodiment, a determination about link quality may facilitate the sharing of media with a user associated with a plurality of devices.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
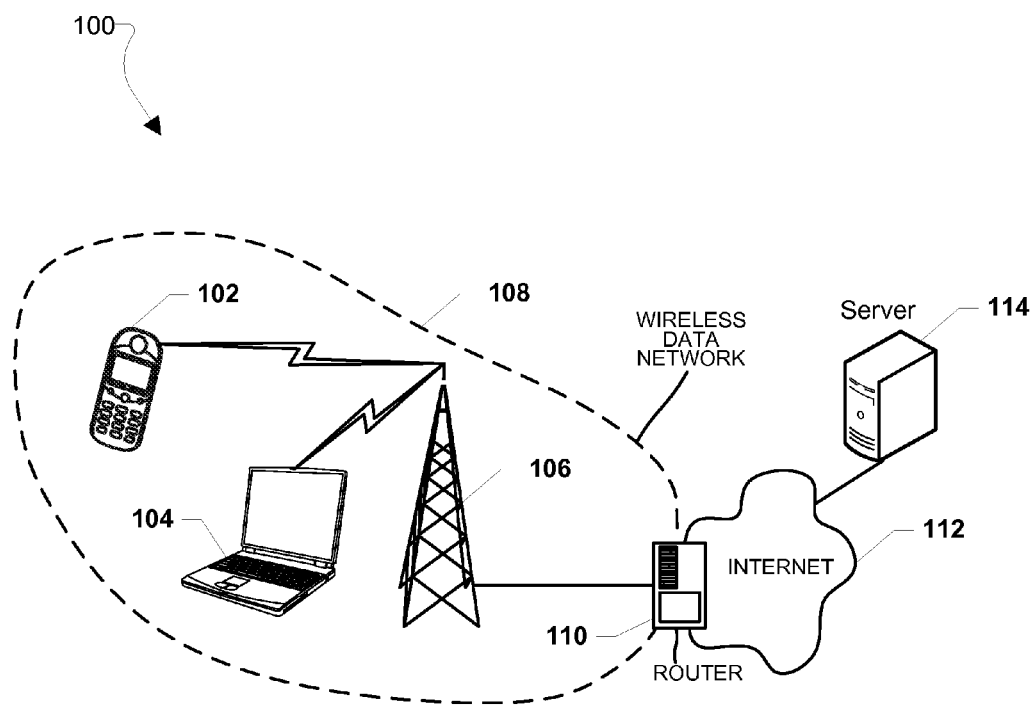
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device," "device," and "mobile computing device" refer to any one or all of cellular telephones, tablet computers, personal data assistants (PDAs), palm-top computers, notebook computers, laptop computers, personal computers, wireless electronic mail receivers and cellular telephone receivers (e.g., the Blackberry® and Treo® devices), multimedia Internet enabled cellular telephones (e.g., Blackberry Storm®), multimedia enabled smart phones (e.g., Android® and Apple iPhone®), and similar electronic devices that include a programmable processor, memory, a communication transceiver, and a display.

The various embodiments are described herein using the term "server." The term "server" is used to refer to any computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on mobile computing devices. A light server or secondary server may be a slimmed-down version of server type functionality that can be implemented on a mobile computing device thereby enabling it to function as an Internet server (e.g., an enterprise e-mail server) only to the extent necessary to provide the functionality described herein.

The systems, methods, and devices of the various embodiments enable adaptive media sharing among a group of communication devices in a communication system. The various embodiments leverage the capabilities of servers and unique Uniform Resource Locators (URLs) to facilitate the sharing of media among groups of devices. In one embodiment, unique URLs may be associated with each version of a media payload provided to a group of devices. In another embodiment, media payloads may be transcoded and a unique URL may be associated with each transcoded version of the media payload provided to a group of devices. In another embodiment, a determination about a most active of a user's devices may facilitate the sharing of media with a user associated with a plurality of devices. In another embodiment, a determination about a cost of downloading may facilitate the sharing of media with a user associated with a plurality of devices. In another embodiment, a determination about link quality may facilitate the sharing of media with a user associated with a plurality of devices. By leveraging the capabilities of file servers and unique Uniform Resource Locators (URLs) the bandwidth requirements for sharing media among groups of devices may be reduced and the media may be ideally adapted for each recipient device.

In an embodiment, an originating user may upload an original media payload to a server and a list of intended (i.e., target) recipients and/or intended recipient devices with whom to share the media payload. Intended recipients may be individual users or a group of users, or a combination thereof. The server may receive the uploaded media payload and store the media payload. The server may associate a URL with the media payload and send the URL back to the originating user. The server may also associate a unique URL with the media payload for each intended recipient, so that the notice sent to each intended recipient includes its own unique URL. Thus, if an originating user sends the same media file to a plurality of recipients, the server may create a URL for the originally uploaded file that is provide to the originating user, and a plurality of different URLs, one for each file to be sent to each intended recipient. Assigning a unique URL to each file sent to each intended recipient may enable the originating user to place target-specific restrictions and controls on the media (such as an expiration time, permissions on use or retransmission, etc.) as discussed below. Also, assigning unique URLs to each intended recipient may facilitate the process of the server formatting the media appropriately for each intended recipient device. In another embodiment, the server may create a URL for a file sent to a group of intended recipients as well as a unique URL for each recipient. Assigning a unique URL for each file sent to each intended recipient and for each group of intended recipients may allow the originating user to place group-specific restrictions and controls on the media as well as allow the server to track group communications. In the various embodiments, the server may deliver the URLs to the intended recipients via any of a variety of communication mechanisms, including push-to-share, email, SMS, HTML, etc. In an embodiment, an intended recipient may use their received URL to fetch the media payload via standard HTML protocols.

In another embodiment, a recipient may wish to share the media payload with new intended recipients. The recipient may send to the server an upload request comprised of a list of new intended recipients and the media payload URL the recipient may have previously received from the server. In an embodiment, the server may determine whether the media file still exists on the server and if so, upload of the media file from the recipient may not be required. The server may send a URL for accessing the media to each of the new intended recipients. In an embodiment, each of the new intended recipients may receive a different URL, and the media associated with their URL may be formatted according to their own mobile device capabilities.

In an embodiment, a new URL may be associated with the media payload each time someone shares the media payload with another recipient. In this manner the originating user's uploading of the payload may result in a first URL being associated with the media payload, forwarding the media to a second user may result in a second URL assigned to the media, and second user's forwarding request may result in a third URL being associated with the media payload. The same media payload may thus be assigned several different URLs, and for each URL there may be different parameters associated with or specified within the URL. In another embodiment, if one of the intended recipients is actually a group of users, the group as a whole may be assigned a unique URL and each user within the group may receive a unique URL. The creation of a unique URL for each upload may allow different characteristics to be set for each recipient. In an embodiment, characteristics associated with each URL may include a set of authorized users of the URL, a Time to Live (TTL) for the URL, or user privileges related to the media payload. In another embodiment a TTL for a URL may be set by each user. In another embodiment, a URL may be associated with a list of authorized users and a security feature may prevent unlisted users from accessing the URL.

In an additional embodiment the URL itself may contain information related to the media, to the target recipient, or both. In this manner the URL itself may contain characteristic information and be self serving. In an embodiment, the URL may contain a TTL as part of the URL string. Including the TTL as part of the URL may allow the server to clean expired URLs automatically from memory using only a URL list. In another embodiment, the URL may contain information about the size or type of media payload the URL may be associated with, information about a sender of the media payload, or both. In an additional embodiment, a media payload may be adapted so that it is compatible with the specific capabilities of each intended recipient device.

In an additional embodiment, a user may upload an original media payload to a server and a list of intended recipients with whom to share the media payload. The server may store the original media payload as an original media file, and may transcode the media payload to suit the capabilities of the intended recipient mobile devices. In another embodiment, the server may access a user profile data base to obtain the device capabilities associated with each intended recipient. Based on the device capabilities obtained from the user profile database, the server may create multiple versions of the original media payload, each adapted to the different capabilities of the various intended recipients' devices. In another embodiment, the server may associate the transcoded media file with the URL associated with the intended recipient. In this manner, when the intended recipient device receives the recipient's URL, the device may use that URL to access the transcoded media file, and thus download a version customized for the device. In an alternative embodiment, the server may generate a variety of differently transcoded media files compatible with the different device characteristics among the group of intended recipients. Each of the transcoded media files may be assigned a unique URL tied to the transcoded format. When an intended recipient attempts to fetch the media payload the server may determine the intended recipient's device capabilities by referencing a user profile database, may determine which of the multiple stored versions of the file to send to the target recipient's device based on its capabilities, and then may forward the corresponding URL to the intended recipient's device. In an alternative embodiment, the server may determine the device capabilities using information within the target device's HTTP GET command for the media payload that the target recipient's device sends in order to access the media file.

In an embodiment, a recipient may attempt to share a transcoded version of the media payload with a new group of target recipients. One of the new group of target recipients may have a device that has different capabilities than the target recipient. The server may not share the transcoded version of the media payload or transcode the version accessed by the target recipient. Instead, the server may use the original media file uploaded by the originator to create a transcoded version suitable for the new group of target recipients. In an alternative embodiment, an application server may accommodate capability upgrades to recipient's devices. This may involve storing the new device capabilities in the user profile database (i.e., updating the capabilities associated with a particular device) and providing previously unusable media payloads now available for download. In an additional embodiment, the server may determine if any previous media payloads intended for the target user were not provided to the user because the user previously lacked capability to view the media payload. If previously un-provided media payloads are found, the server may provide previously unusable media payloads for download.

In another embodiment, a media payload may be delivered to a target user who owns multiple devices, such as a tablet and a smart phone. Both the tablet and the phone may be associated with the target user in a user profile database and capabilities may be stored in the user profile database for each device. The originating user may share a media payload with a target user by sending the media payload and the target user's address to the server. The server may fetch the target user's profile information from a user profile database based on the target user's address. The target user's profile information may indicate the user's two devices, the tablet and the phone. In an embodiment, the server may select one of the devices to send the file to, such as by determining the activity level of each device. In the various embodiments, the activity level of a device may be made based on a device setting, information sent by the device, interactions with the server, or historical information associated with the device. In an embodiment, the target's two devices may have different characteristics and therefore, the URL sent to each may differ. In an alternative embodiment, the server may select a device to send the media payload to based on cost associated with downloading media payloads. In another alternative embodiment, the server may select a device to send the media payload to based on quality of service determinations associated with each device.

FIG. 1 illustrates a wireless network system 100 suitable for use with the various embodiments. Mobile devices 102 and 104 and a wireless transmitter/receiver of a wireless cell tower or base station 106 together make up a wireless data network 108. Using the wireless data network 108, data may be transmitted wirelessly between the mobile devices 102 and 104 and the wireless cell tower or base station 106. The transmissions between the mobile devices 102 and 104 and the wireless cell tower or base station 106 may be by any cellular networks, including Wi-Fi, CDMA, TDMA, GSM, PCS, G-3, G-4, LTE, or any other type connection. The wireless network 108 may be in communication with a router 110 which connects to the Internet 112. In this manner data may be transmitted from/to the mobile devices 102 and 104 via the wireless network 108, and router 110 over the Internet 112 to/from a server 114 by methods well known in the art. While the various embodiments are particularly useful with wireless networks, the embodiments are not limited to wireless networks and may also be implemented over wired networks with no changes to the methods.

Figure 2:
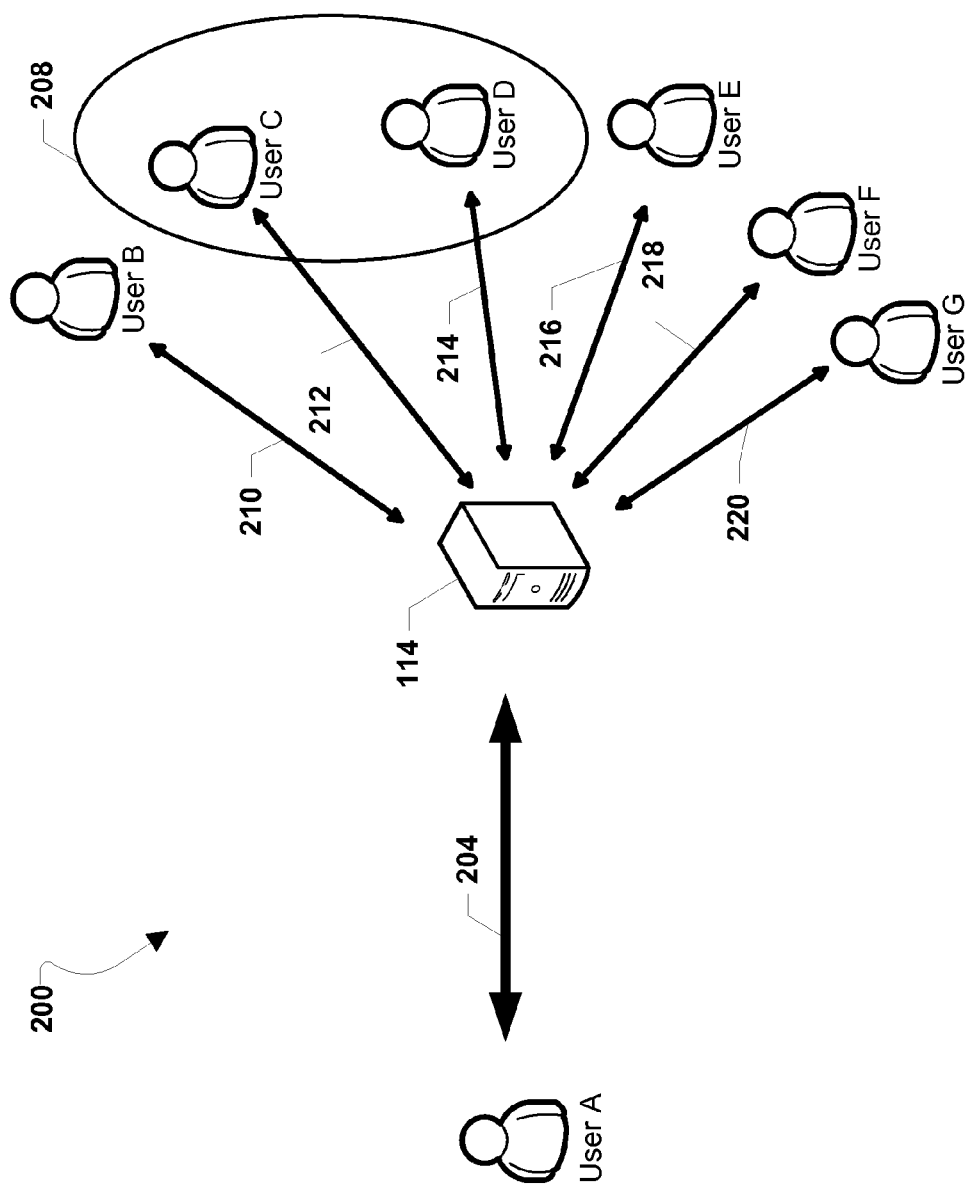
FIG. 2 is a communications flow diagram of interactions in a communication system suitable for use with the various embodiments.

FIG. 2 illustrates interactions in a communication system 200 suitable for use with the various embodiments. As an example, communication system 200 may be a push-to-share communication system. Communication system 200 may be comprised of an originating user, User A, a server 114, and six intended recipient users, Users B, C, D, E, F, and G. While discussed in terms of seven Users A, B, C, D, E, F, and G, the communication system 200 may be comprised of any amount of users, such as two users or a hundred users. In operation the communication system 200 may enable User A to share a media payload with the intended recipients, Users B, C, D, E, F, and G. A media payload may be any file, media, or data structure, such as a JPEG, MPEG, application, WAV, GIF, TIFF, or MP4. As an example, User A may have an original media payload User A wishes to share. User A may upload the original media payload to the server 114 via a connection 204 between User A's device and the server 114. Additionally, User A may upload a list of intended recipient devices to the server 114 via connection 204. As an example, the list of intended recipient devices may be a list of devices associated with Users B, C, D, E, F, and G. Additionally, a list of intended recipient devices may include a group of recipient devices, such as group 208. Group 208 may be comprised of recipient devices of more than one user, such as Users C and D. As an example, communications intended for Group 208 may be sent to devices associated with both Users C and D. While discussed in terms of two Users C and D, Group 208 may be comprised of any number of users, and may include all the intend recipient devices.

The server 114 may receive the original media payload and the list of intended recipients, and may store the original media payload the list of intended recipients. The server 114 may associate a unique URL with the original media payload and may provide the URL back to User A's device via connection 204. The serve 114 may also associate an individual unique URL with the media payload for each intended recipient device. In this manner, a notice sent to each recipient device may include its own individual unique URL. Additionally, the server 114 may associate an overall unique URL for the group of recipient devices. In this manner, a notice sent to each recipient device may include an individual unique URL for the device, and a unique overall unique group URL. As an example, server 114 may send an individual unique URL and/or a unique group URL to User B's device via connection 210, an individual unique URL and/or a unique group URL to User C's device via connection 212, an individual unique URL and/or a unique group URL to User D's device via connection 214, an individual unique URL and/or a unique group URL to User E's device via connection 216, an individual unique URL and/or a unique group URL to User F's device via connection 218, and an individual unique URL and/or a unique group URL to User G's device via connection 220. Additionally, group 208 may also be assigned a unique URL. In this manner, User C's device may receive an individual unique URL, a unique group URL, and/or a unique URL for group 208 via connection 212. Also, User D's device may receive an individual unique URL, a unique group URL, and/or a unique URL for group 208 via connection 214. The creation of unique URLs may allow different characteristics to be associated with each URL as discussed further below. The Users B, C, D, E, F, and G may then use their received URLs to fetch the media payload via connections 210, 212, 214, 216, 218, and 220, respectively.

Figure 3:
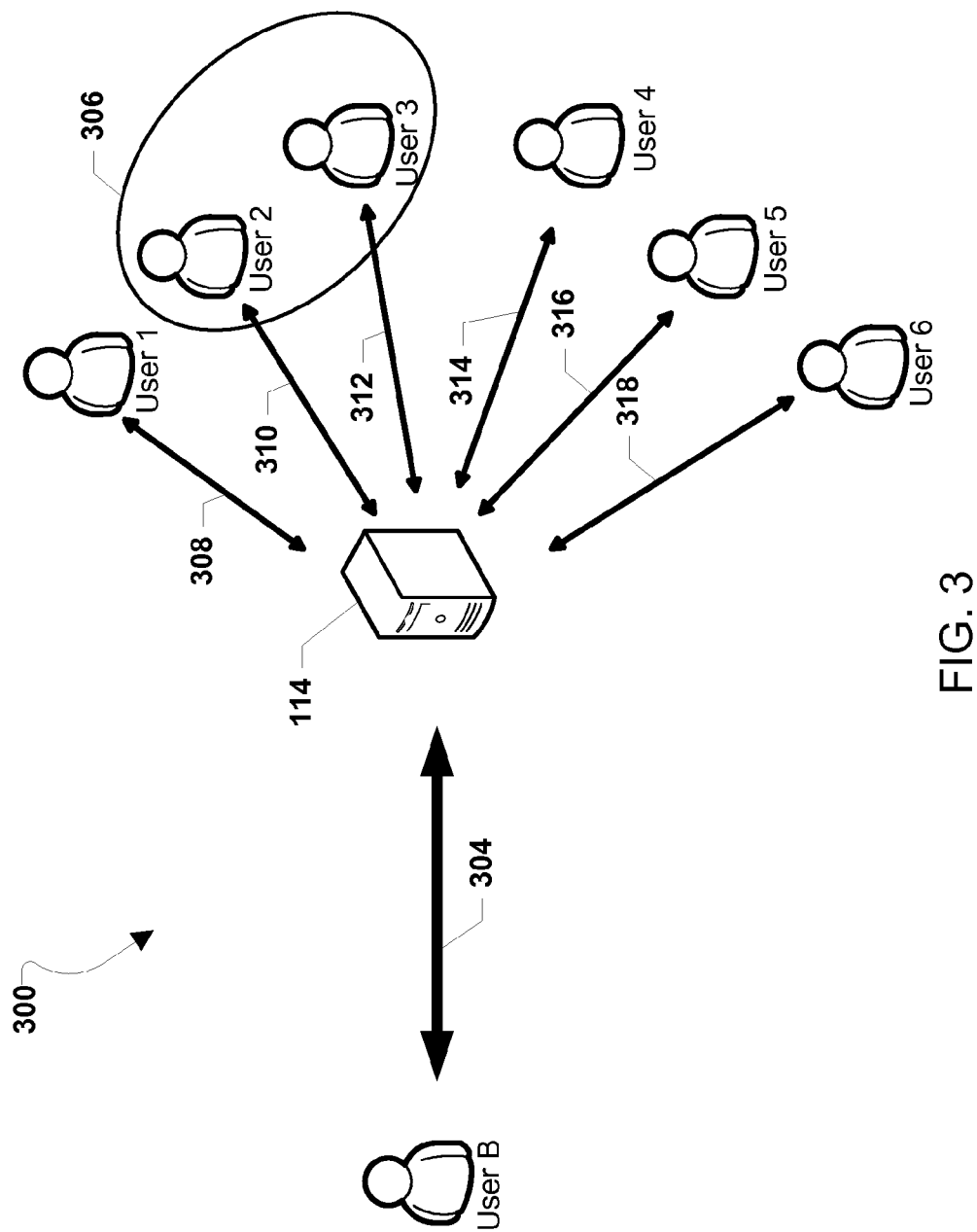
FIG. 3 is a communications flow diagram of additional interactions in a communication system suitable for use with the various embodiments.

FIG. 3 illustrates interactions in a communication system 300 suitable for use with the various embodiments. Communication system 300 may be similar to communication system 200 described above with reference to FIG. 2, except that communication system 300 may enable User B to share the media payload shared by User A with new Users 1, 2, 3, 4, 5, and 6. In operation communication system 300 may enable a User B to share a media payload with the intended recipients, Users 1, 2, 3, 4, 5, and 6. A media payload may be any file, media, or data structure, such as a JPEG, MPEG, application, WAV, GIF, TIFF, or MP4. As an example, User B may send an upload request to the server 114 via a connection 304 between User B's device and the server 114. The upload request may include a media payload URL User B previously received. Additionally, User B may upload a list of intended recipient devices to the server 114 via connection 304. As an example, the list of intended recipient devices may be a list of devices associated with Users 1, 2, 3, 4, 5, and 6. Additionally, a list of intended recipient devices may include a group of recipient devices, such as group 306. Group 306 may be comprised of recipient devices of more than one user, such as Users 2 and 3. As an example, communications intended for Group 306 may be sent to devices associated with both Users 2 and 3. While discussed in terms of two Users 2 and 3, Group 306 may be comprised of any number of users, and may include all the intend recipient devices.

The server 114 may determine if the URL received in the upload request is associated with the original media payload stored on the server 114. If the URL is not associated with the original media payload stored on the server 114, the server 114 may request User B upload the media payload via connection 304.

If the URL is associated with the original media payload stored on the server 114, the server 114 may associate an individual unique URL with the media payload for each intended recipient device. In this manner, a notice sent to each recipient device may include its own individual unique URL. Additionally, the server 114 may associate an overall unique URL for the group of recipient devices. In this manner, a notice sent to each recipient device may include an individual unique URL for the device, and a unique overall unique group URL. As an example, server 114 may send an individual unique URL and/or a unique group URL to User 1's device via connection 308, an individual unique URL and/or a unique group URL to User 2's device via connection 310, an individual unique URL and/or a unique group URL to User 3's device via connection 312, an individual unique URL and/or a unique group URL to User 4's device via connection 314, an individual unique URL and/or a unique group URL to User 5's device via connection 316, and an individual unique URL and/or a unique group URL to User 6's device via connection 318. Additionally, group 306 may also be assigned a unique URL. In this manner, User 3's device may receive an individual unique URL, a unique group URL, and/or a unique URL for group 306 via connection 310. Also, User 3's device may receive an individual unique URL, a unique group URL, and/or a unique URL for group 306 via connection 312. The creation of unique URLs may allow different characteristics to be associated with each URL as discussed further below. The Users 1, 2, 3, 4, 5, and 6 may then use their received URLs to fetch the media payload via connections 308, 310, 312, 314, 316, and 318, respectively.

Figure 4:
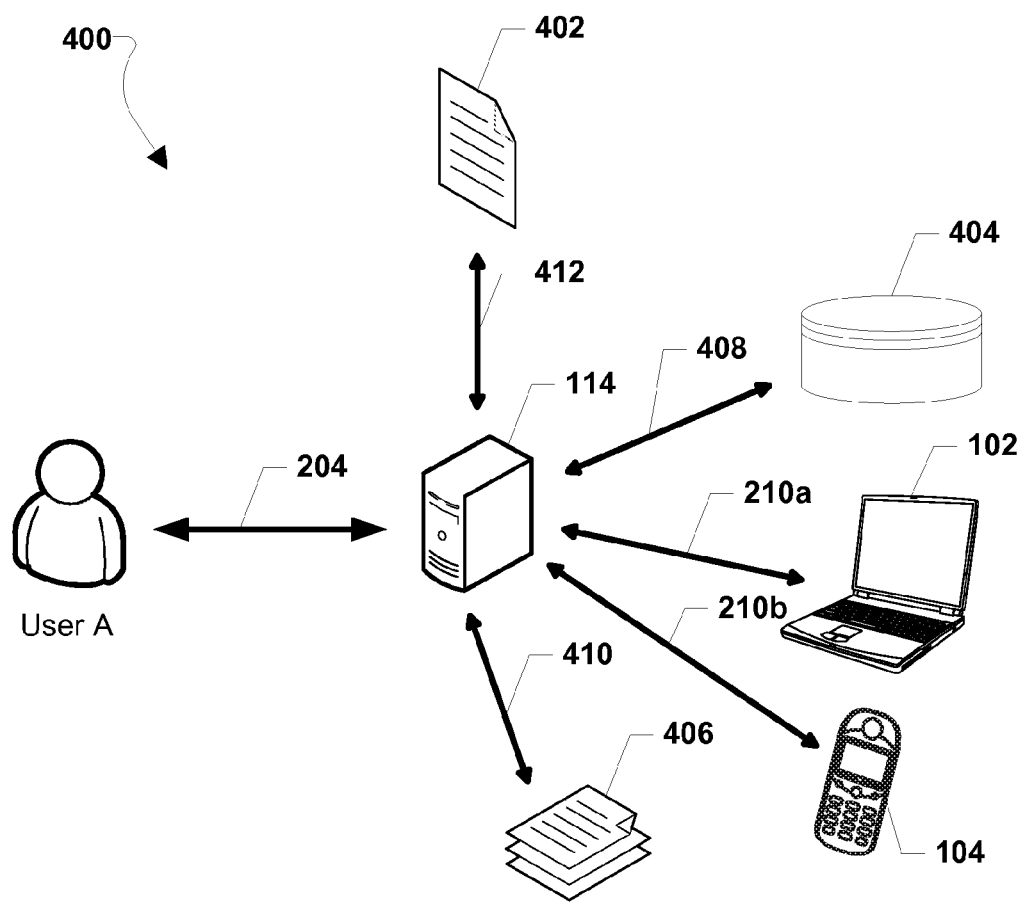
FIG. 4 is a data flow diagram of interactions in a communication system for use with the various embodiments.

FIG. 4 illustrates data flow interactions in a communication system 400 suitable for use with the various embodiments. Communication system 400 may be similar to communication system 200 described above with reference to FIG. 2 except that system 400 may enable transcoding of media payloads and varied communications for multiple user devices. As discussed above with reference to FIG. 2, in an embodiment User A may upload an original media payload and list of intended recipient devices to the server 114 via a connection 204 between User A's device and the server 114. The server 114 may store the original media payload as a stored original media payload 402. The stored original media payload 402 may be stored on the server 114 and the stored original media payload 402 may be accessible via data pathway 412. In an alternative embodiment (not shown), the stored original media payload 402 may be stored in a database, additional server, or storage location remote from the server 114.

In an embodiment, the server 114 may access a user profile database 404 via connection 408 to determine the capabilities of the intended recipient devices on the list of intended recipients. In an alternative embodiment (not shown), the user profile database 404 may be resident on the server 114. Device capabilities may be any capability of a user's device, such as screen resolution, operating system, installed media viewers, and/or audio output capability. The server 114 may determine transcoding of the media payload is required. As an example, the server 114 may determine, based on information in the user profile database 404, the device screen resolutions for each of the intended recipient devices, and may transcode the stored original media payload 402 into a transcoded media payload 406 for each of the intended recipient devices. The transcoded media payload 406 for each of the intended recipient devices may be stored on the server 113 and the stored transcoded media payload 406 may be accessible via data pathway 410.

In an embodiment, the server 114 may associate a unique URL with the stored original media payload 402 and a separate unique URL with the stored transcoded media payload 406. The server 114 may transmit the transcoded URL and/or the transcoded media to the devices 102 and 104 via connections 210a and 210b, respectively. As an example, devices 102 and 104 may both be devices associated with User B, as discussed above with reference to FIG. 2. In an embodiment, the server 114 may determine which of the devices 102 and 104 is the most active or has the lowest cost of downloading, or may determine which connection 210a or 210b may be the highest quality connection and may transmit the original media payload or transcoded media payload to that device, and the URL for the respective media payload to any other devices.

Figure 5:
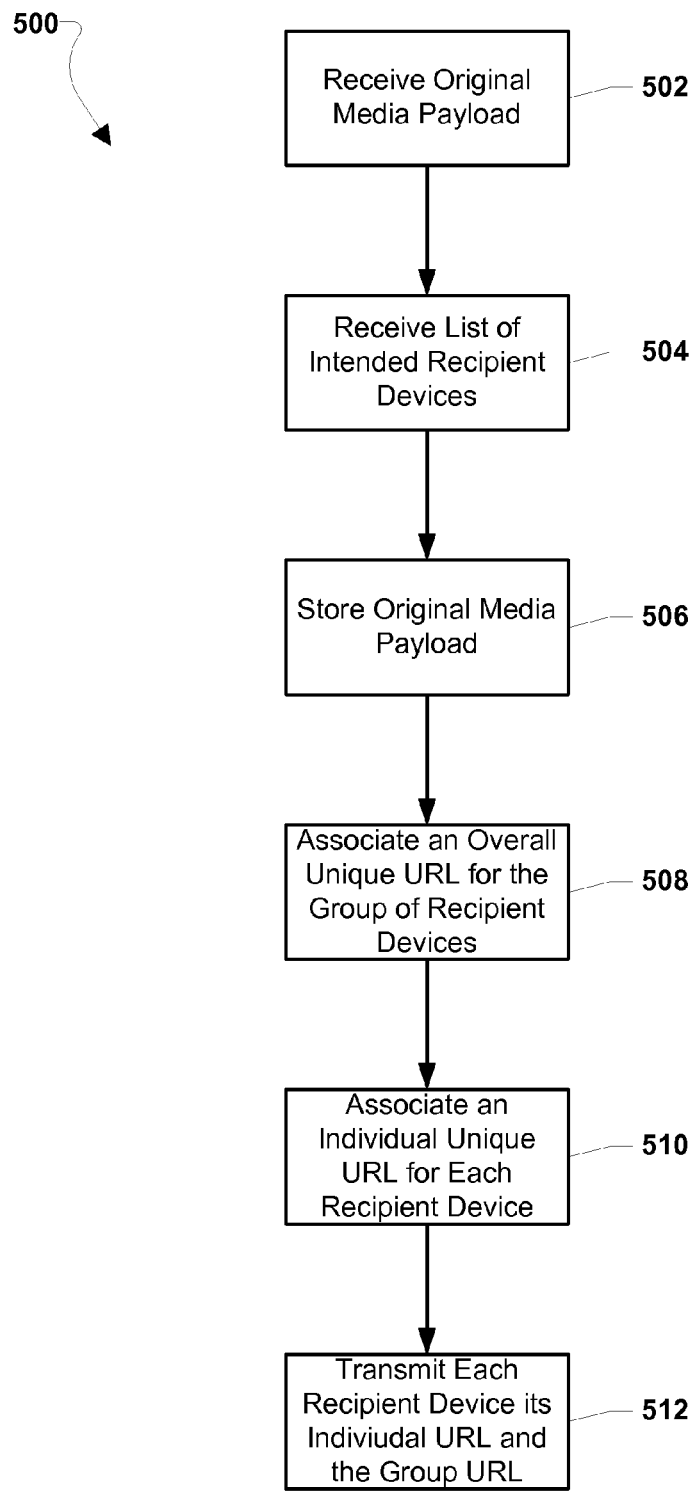
FIG. 5 is a process flow diagram illustrating an embodiment method for sharing media with recipient devices.

FIG. 5 illustrates an embodiment method 500 for sharing media with recipient devices. As an example, the method 500 may be implemented by a server 114 that may be part of a wireless network system 100 as described above with reference to FIG. 1. At block 502 the server 114 may receive an original media payload. As an example, the original media payload may be a media payload uploaded by a user, such as User A using a mobile device 102. A media payload may be any file, media, or data structure, such as a JPEG, MPEG, application, WAV, GIF, TIFF, or MP4. At block 504 the server 114 may receive a list of intended recipient devices. As an example, the list of intended recipient devices may be a list of devices associated with Users B, C, D, E, F, and G. At block 506 the server 114 may store the original media payload. In an embodiment, the server 114 may store the original media payload in a memory resident on the server 114. In an alternative embodiment, the server 114 may store the original media payload in a location remote from the server 114. At block 508 the server 114 may associate an overall unique URL for the group of recipient devices. As an example, the server 114 may associate an overall unique URL for all the recipient devices on the list of recipient devices received at block 504. In this manner, a single unique URL may be associated with all the recipient devices as a group. In an alternative embodiment, the group of recipient devices may include less than all of the recipient devices on the list of intended recipient devices. In this manner, a single unique URL may be associated with a subset of the recipient devices on the list of intend recipient devices. At block 510 the server 114 may associate an individual unique URL for each recipient device. As an example, the server 114 may associate a unique URL for each recipient device of Users B, C, D, E, F, and G, such that at least six unique URLs may be created. In an alternative embodiment, a recipient device may be a group of recipient devices. In this manner the group of recipient devices may receive a unique URL, as well as the devices comprising the group. As an example, an intended recipient device may be a group comprised of the devices of Users C and D. The server 114 may assign a unique URL to the group of Users C and D and a unique URL to each of the Users C and D. In block 512 the server 114 may transmit each recipient device its individual URL and the group URL. As an example, the server 114 may transmit User B an individual unique URL uniquely associated with User B as well as an overall unique group URL for the group of Users B, C, D, E, F, and G.

Figure 6:
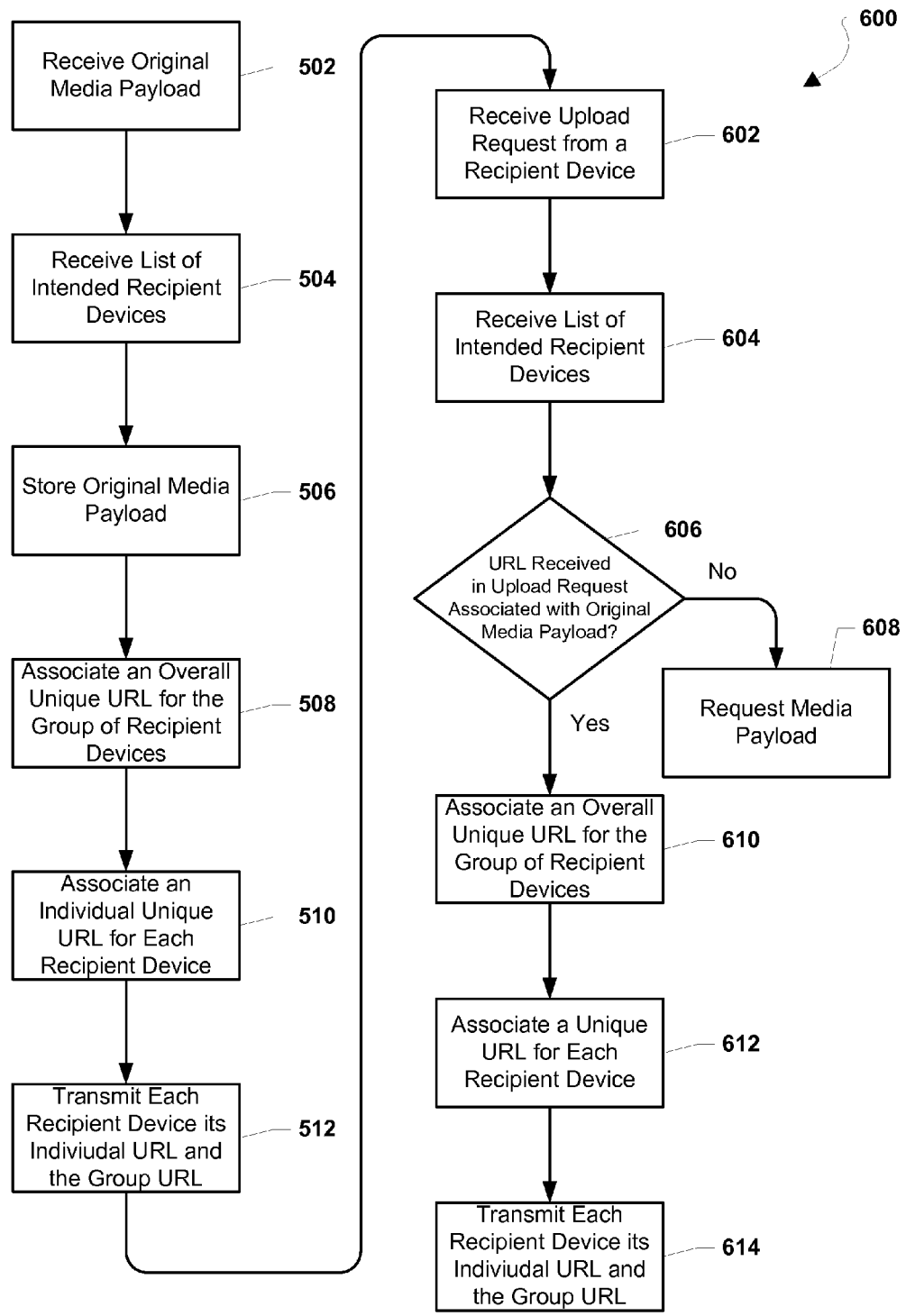
FIG. 6 is a process flow diagram illustrating a second embodiment method for sharing media with recipient devices.

FIG. 6 illustrates an embodiment method 600 for sharing media with recipient devices which may be used in conjunction with method 500 described above with reference to FIG. 5. At blocks 502, 504, 506, 508, 510, and 512 the server 114 may perform operations of like numbered blocks of method 500 described above with reference to FIG. 5. At block 602 the server 114 may receive an upload request from a recipient device. An upload request may include a URL associated with a media payload. As an example, the upload request may be received from a recipient device to which an individual URL and the group URL were transmitted in block 512 and the upload request may include the individual URL and/or the group URL. At block 604 the server 114 may receive a list of intended recipient devices. As an example, the list of intended recipient devices may be a list of devices associated with Users 1, 2, 3, 4, 5, and 6.

At determination block 606 the server 114 may determine if the URL received in the upload request is associated with the original media payload. As an example, the server 114 may determine the URL is associated with the original media payload file by comparing the URL to a URL list in a database available to the server 114, or by using information available in the URL itself. If the URL received is not associated with original payload (i.e., determination block 606="No"), at block 608 the server 114 may request the media payload from the recipient device.

If the URL received is associated with the original media payload (i.e., determination block 606="Yes"), at block 610 the server 114 may associate an overall unique URL for the group of recipient devices. As an example, the server 114 may associate an overall unique URL for all the recipient devices on the list of recipient devices received at block 604. In this manner, a single unique URL may be associated with all the recipient devices as a group. In an alternative embodiment, the group of recipient devices may include less than all of the recipient devices on the list of intended recipient devices. In this manner, a single unique URL may be associated with a subset of the recipient devices on the list of intend recipient devices. At block 612 the server 114 may associate an individual unique URL for each recipient device. As an example, the server 114 may associate a unique URL for each recipient device of Users 1, 2, 3, 4, 5, and 6, such that at least six unique URLs may be created. In an alternative embodiment, a recipient device may be a group of recipient devices. In this manner the group of recipient devices may receive a unique URL, as well as the devices comprising the group. As an example, an intended recipient device may be a group comprised of the devices of Users 2 and 3. The server 114 may assign a unique URL to the group of Users 2 and 3 and a unique URL to each of the Users 2 and 3. In block 614 the server 114 may transmit each recipient device its individual URL and the group URL. As an example, the server 114 may transmit User 1 an individual unique URL uniquely associated with User 1 as well as an overall unique group URL for the group of Users 1, 2, 3, 4, 5, and 6.

Figure 7:
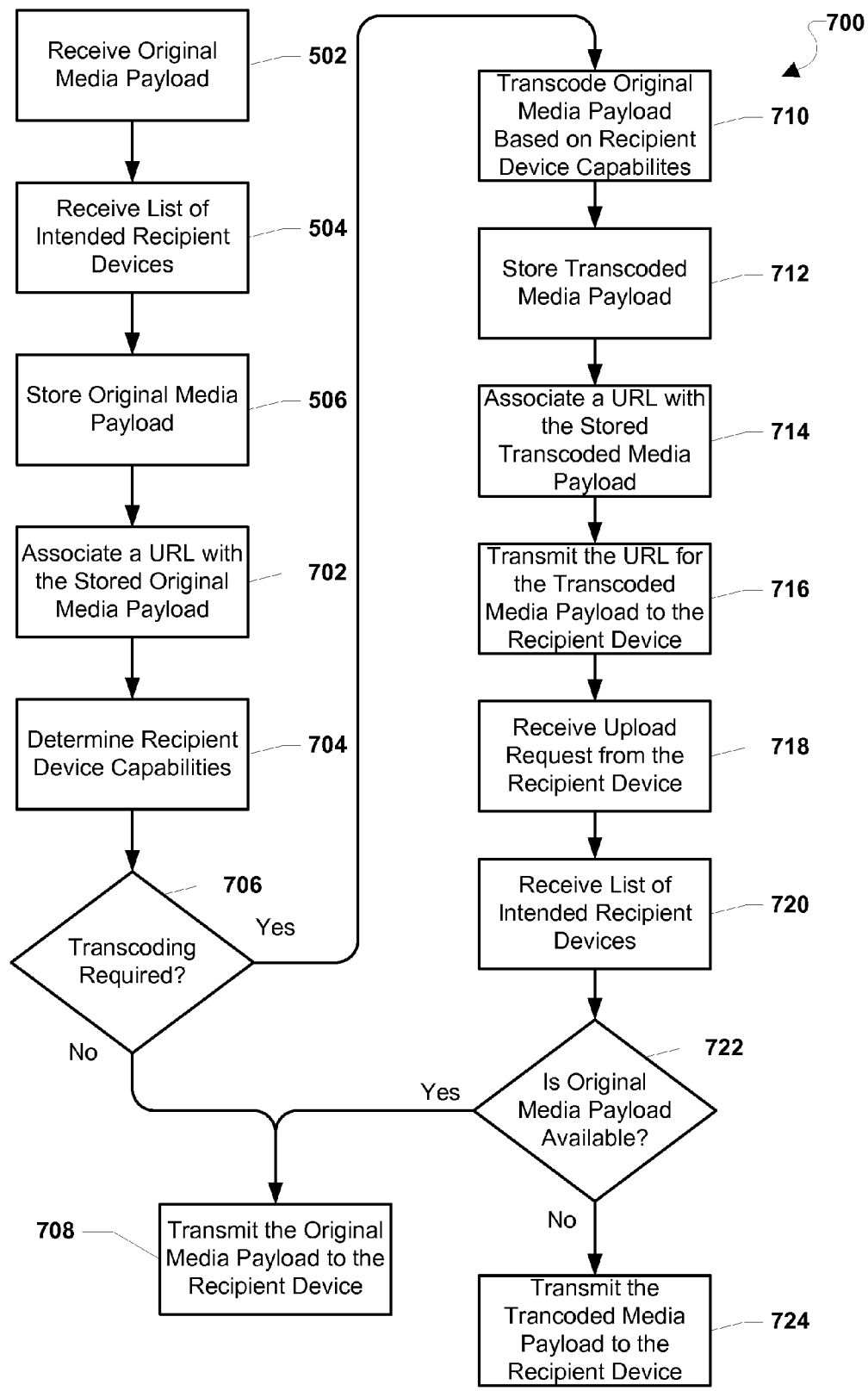
FIG. 7 is a process flow diagram illustrating an embodiment method for transcoding media for sharing with recipient devices.

FIG. 7 illustrates an embodiment method 700 for transcoding media for sharing with recipient devices which may be used in conjunction with method 500 described above with reference to FIG. 5. At blocks 502, 504, and 506 the server 114 may perform operations of like numbered blocks of method 500 described above with reference to FIG. 5. At block 702 the server 114 may associate a URL with the stored original media payload. At block 704 the server 114 may determine recipient device capabilities for the devices listed on the list of intended recipient devices. As an example, the server 114 may compare the recipient devices on the list of intended recipient devices to a user profile database 404 to determine a recipient device's capabilities. As an additional example, the server 114 may determine a recipient device's capabilities based on information contained in a request for media from an intended recipient device, such as a User-Agent field in an HTTP GET.

At determination block 706 the server 114 may determine if transcoding of original media payload is required. As an example, the server 114 may determine that one of the intended recipient devices has a display resolution different than the resolution of an image uploaded as the original media payload by comparing the device capabilities determined in block 704 to attributes associated with the original media payload. If transcoding is not required (i.e., determination block 706="No"), at block 708 the server 114 may transmit the original media payload to the recipient devices.

If transcoding is required (i.e., determination block 706="Yes"), at block 710 the server 114 may transcode the original media payload based on the recipient device capabilities. Transcoding may involve any change of a media payload, such as converting one file or media type to another and/or reducing or increasing the resolution or size of a media payload. As an example, the server 114 may transcode the original media file by down scaling an image to match the display resolution of an intended recipient device. At block 712 the server 114 may store the transcoded media payload. At block 714 the server 114 may associate a URL with the stored transcoded media payload. At block 716 the server 114 may transmit the URL of the transcoded media payload to the recipient device. At block 718 the server 114 may receive an upload request from the recipient device. An upload request may include a URL associated with a media payload. As an example, the upload request may be received from a recipient device to which the URL for the transcoded media was transmitted in block 716 and the upload request may include the URL for the transcoded media. At block 720 the server 114 may receive a list of intended recipient devices.

At determination block 722 the server 114 may determine if the original media payload is still available to the server 114. If the original media payload is still available to the server 114 (i.e., determination block 722="Yes"), at block 708 the server 114 may transmit the original media payload to the recipient devices. In this manner re-transcoding of media may be avoided and a higher quality image may be provided to the recipient devices. If the original media payload is not available to the server 114 (i.e., determination block 722="No"), at block 724 the server 114 may transmit the transcoded media payload to the recipient devices.

Figure 8:
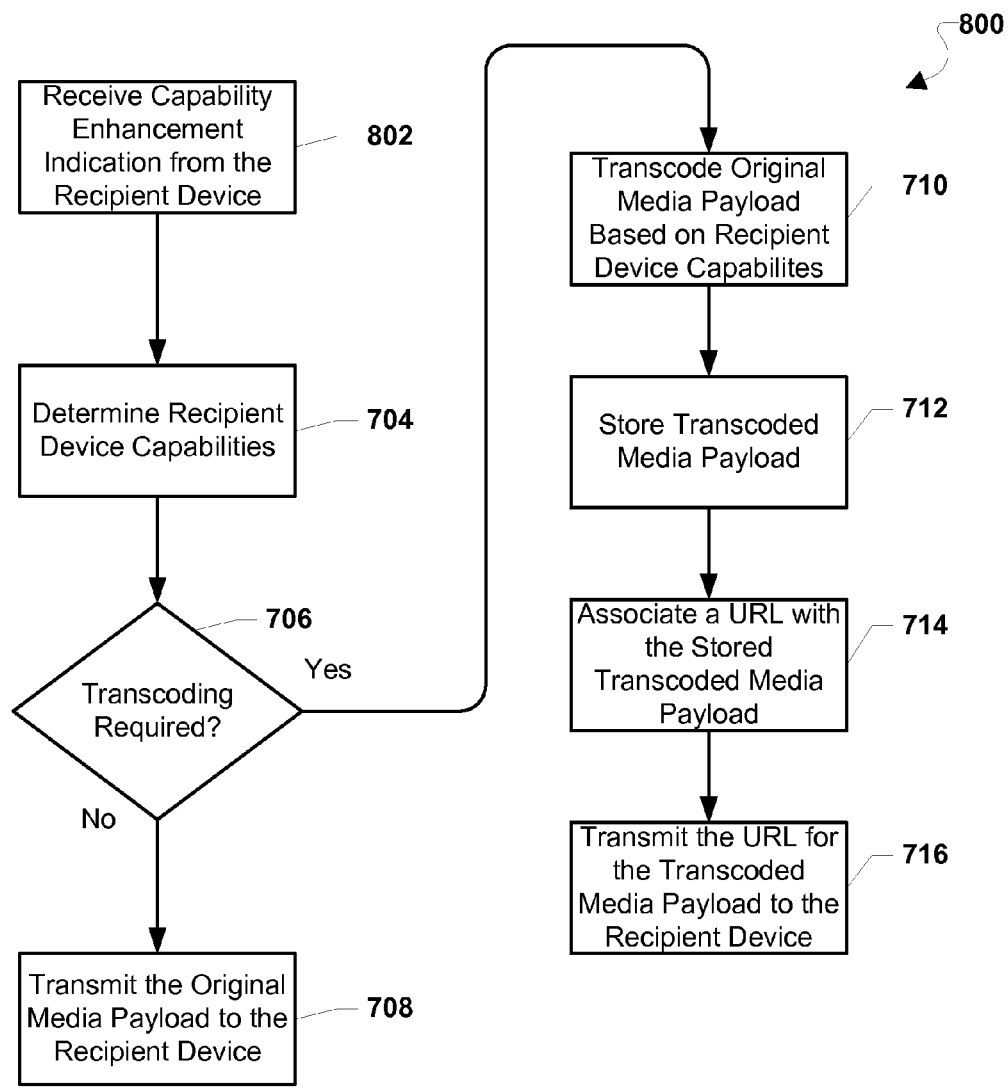
FIG. 8 is a process flow diagram illustrating an embodiment method for transcoding media in response to recipient device capability enhancements.

FIG. 8 illustrates an embodiment method 800 for transcoding media in response to recipient device capability enhancements which may be used in conjunction with method 700 described above with reference to FIG. 7. At block 802 the server 114 may receive a capability enhancement indication from the recipient device. As an example, the indication may be received in response to a user registering an updated device capability with the server 114 or a user profile database 404, such as the user replacing a device, or the user downloading or updating an application that enhances a device's ability to decode image formats, sound files, or video streams. As an example, the capability enhancement may now enable the recipient device to utilize the original media payload. Alternatively, the capability enhancement may now enable the recipient device to utilize a higher quality transcoded media payload. In an embodiment, in order to provide the enhanced capability recipient device with either the original payload or access to another transcoded media payload, at blocks 706, 708, 710, 712, 714, and 716 the server 114 may perform operations of like numbered blocks of method 700 described above with reference to FIG. 7.

Figure 9:
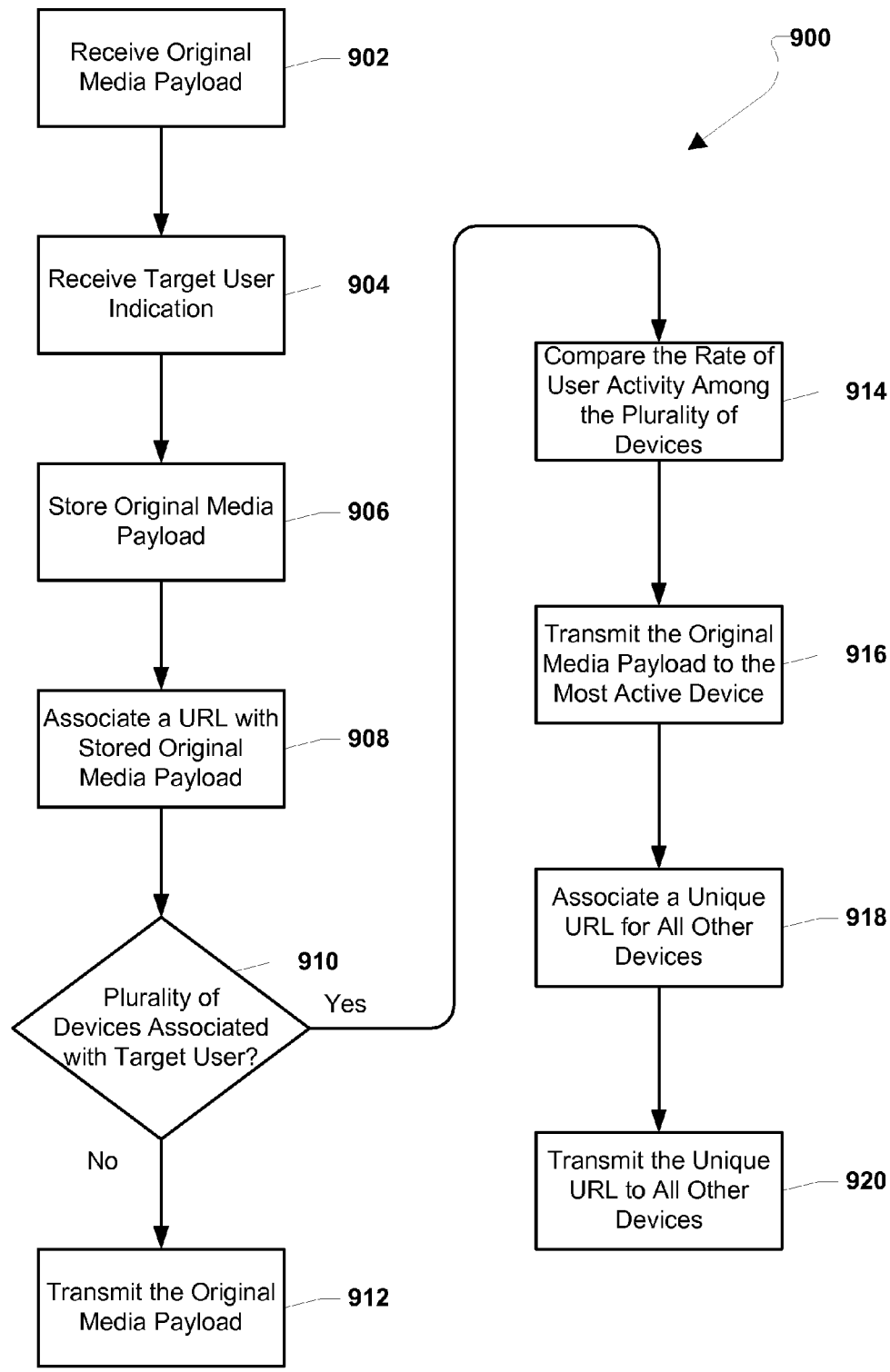
FIG. 9 is a process flow diagram illustrating an embodiment method for transmitting media to a most active device of a plurality of devices.

FIG. 9 illustrates an embodiment method 900 for transmitting media to a most active device of a plurality of devices. As an example, the method 900 may be implemented by a server 114 that may be part of a wireless network system 100 as described above with reference to FIG. 1. As users may be associated with a plurality of devices, such as devices 102 and 104, method 900 may enable media to be transmitted to the most active of a plurality of devices. At block 902 the server 114 may receive an original media payload. As an example, the original media payload may be a media payload uploaded by a user, such as User A using a mobile device 102. A media payload may be any file, media, or data structure, such as a JPEG, MPEG, application, WAV, GIF, TIFF, or MP4. At block 904 the server may receive a target user indication. As an example, a target user indication may be an indication of a user, such as User B for which the original media payload is intended. At block 906 the server 114 may store the original media payload. In an embodiment, the server 114 may store the original media payload in a memory resident on the server 114. In an alternative embodiment, the server 114 may store the original media payload in a location remote from the server 114. At block 908 the server 114 may associate a URL with the stored original media payload.

At determination block 910 the server 114 may determine if a plurality of devices is associated with the target user. As an example, the server 114 may compare the target user a user profile database 404 to determine if more than one device is associated with the target user. If only a single device is associated with the target user (i.e., determination block 910="No"), at block 912 the server 114 may transmit the original media payload to that device.

If more than one device is associated with a target user (i.e., determination block 910="Yes"), at block 914 the server 114 may compare the rate of user activity among the plurality of devices. The rate of user activity may be determined in any way, such as by the server 114 determining the number of active TCP/UDP connections for each device, and a comparison of the rate of user activity may rank the device with highest number of active TCP/UDP connections as the most active device. As an additional example, the server 114 may determine the time at which each device last acknowledged a message from the server 114, and the device that most recently acknowledged a message from the server 114 may be ranked as the most active device. As another example, the server 114 may determine the time at which each device last sent a request to the server 114, and the device that most recently sent a message to the server 114 may be ranked as the most active device. As still another example, the server 114 may determine a time at which each device registered with the server 114, and may rank the device that most recently registered with the server 114 as the most active device. As yet another example, the rate of user activity may be determined by the server 114 receiving a message from a device indicating that there has been user interface activity, such as a user scrolling or using a touch interface of the device, which may indicate the user is in close proximity to the device and that device may therefore be ranked the most active device.

At block 916 the server 114 may transmit the original media payload to the most active device. At block 918 the server 114 may associate a unique URL for all other devices. At block 920 the server 114 may transmit the unique URL to all other devices. In this manner, only the most active device may be transmitted the original media payload, while the rest of a target user's devices are transmitted a unique URL as a notification that original media payload is available. The limited transmission of the original media payload may save both network resources by not transmitting multiple original media payloads, and may save device resources by not requiring less active devices to download the original media payload.

Figure 10:
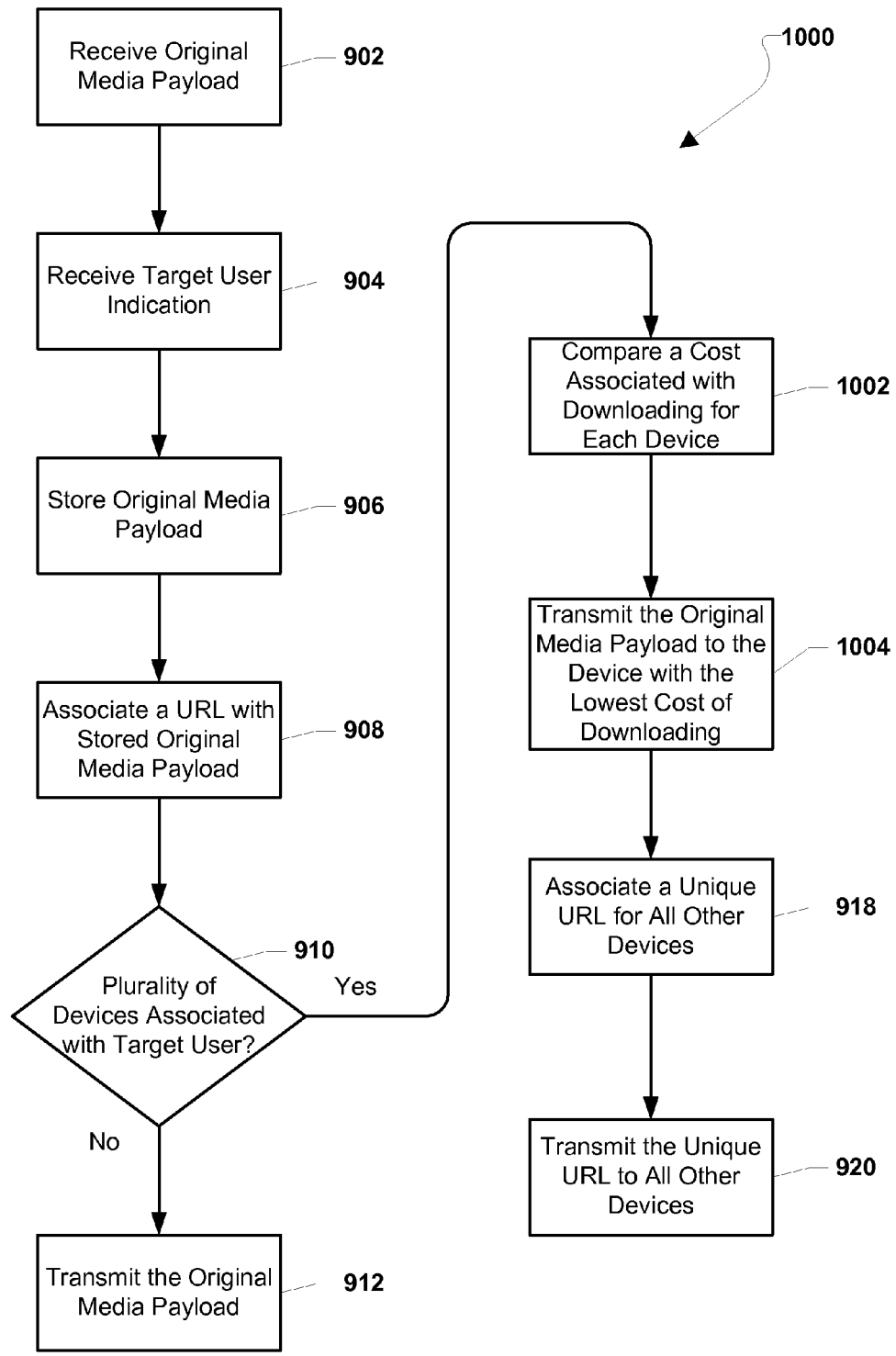
FIG. 10 is process flow diagram illustrating an embodiment method for transmitting media to a device with the lowest download cost of a plurality of devices.

FIG. 10 illustrates a method 1000 for transmitting media similar to method 900 described with reference to FIG. 9, except that cost associated with downloading may be used to determine which device of a plurality of devices to transmit the original media payload to. At blocks 902, 904, 906, 908, 910, and 912 the server 114 may perform operations of like numbered blocks of method 900 described above with reference to FIG. 9. If a plurality of devices is associated with a target user (i.e., determination block 910="Yes"), at block 1002 the server 114 may compare a cost associated with downloading for each device. The cost associated with downloading may be determined in any way, such as by the server 114 determining a type of connection a device is using, such as a Wi-Fi connection or 3-G connection. The server 114 may be provided information indicating that Wi-Fi connections may generally be available free of charge, while 3-G connections may be associated with a limited data plan which charges for downloads. Based on that information, the server 114 may determine a device utilizing a Wi-Fi connection has a lower cost of downloading than a device utilizing a 3-G connection.

At block 1004 the server 114 may transmit the original media payload to the device with the lowest cost of downloading. At block 918 the server 114 may associate a unique URL for all other devices. At block 920 the server 114 may transmit the unique URL to all other devices. In this manner, only the device with the lowest cost of downloading may be transmitted the original media payload, while the rest of a target user's devices are transmitted a unique URL as a notification that original media payload is available. The limited transmission of the original media payload may save the target user money because only the connection with the lowest cost of downloading may be required to download the original media payload.

Figure 11:
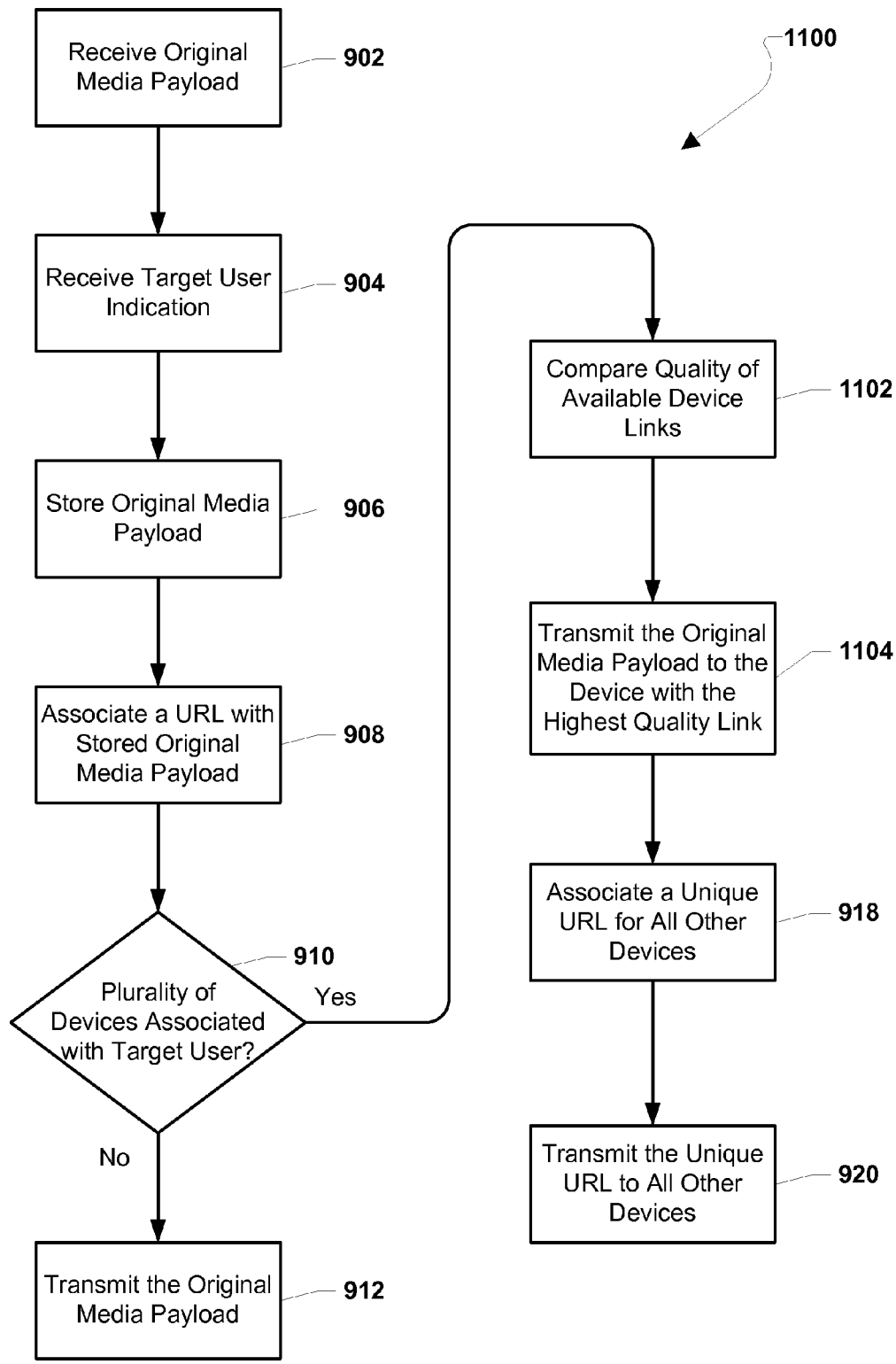
FIG. 11 is process flow diagram illustrating an embodiment method for transmitting media to a highest quality of service device of a plurality of devices.

FIG. 11 illustrates a method 1100 for transmitting media similar to method 900 described with reference to FIG. 9, except that quality of the available device links may be used to determine which device of a plurality of devices to transmit the original media payload to. At blocks 902, 904, 906, 908, 910, and 912 the server 114 may perform operations of like numbered blocks of method 900 described above with reference to FIG. 9. If a plurality of devices is associated with a target user (i.e., determination block 910="Yes"), at block 1102 the server 114 may compare a quality of available device links for the devices associated with a target user. The cost quality of available device links may be determined in any way, such as by the server 114 periodically monitoring the quality of the underlying network across the plurality of devices and determining the device with the most stable and/or higher capacity network connection to be the device with the highest quality link.

At block 1104 the server 114 may transmit the original media payload to the device with the highest quality link. At block 918 the server 114 may associate a unique URL for all other devices. At block 920 the server 114 may transmit the unique URL to all other devices. In this manner, only the device with the highest quality link may be transmitted the original media payload, while the rest of a target user's devices are transmitted a unique URL as a notification that original media payload is available. The limited transmission of the original media payload may increase a target user's quality of experience because delay and latency may be reduced by transmitting the original media payload to the device with the highest quality link.

Figure 12:
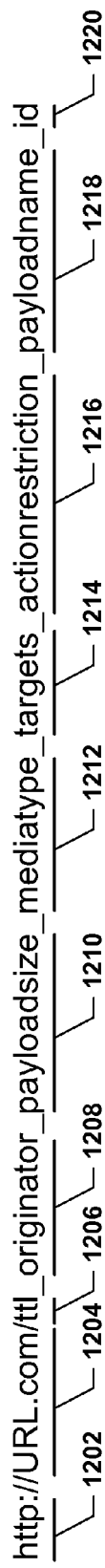
FIG. 12 is diagram of an example embodiment of a unique URL.

FIG. 12 is a diagram illustrating an example of a unique URL. In the various embodiments a unique URL may enable different parameters to be associated with a URL. Associating a unique URL with a media payload as described above in reference to any of the embodiment methods, 500, 600, 700, 800, 900, 1000, or 1100 may enable independent management of media payloads irrespective of the originator, list of intended recipients, or TTL. A unique URL may be comprised of multiple components such as a protocol 1202, domain name 1204, TTL 1206, originator 1208, payload size 1210, media type 1212, targets 1214, action restriction 1216, payload name 1218, and/or id number 1220. While not shown, a unique URL may additionally be comprised of additional parts such as ports and paths. The multiple components of a URL may contain information may enable independent management of each URL and the payload associate with each URL. Unique URLs and the information contained in the multiple components of a unique URL as described in relation to FIG. 12 are distinguished from query parameters which have been associated with URLs in the past. A query parameter is a string added to an already existing URL to be provided to an application and, as an added string, is not information contained in the URL. In contrast the multiple components of a URL described in relation to FIG. 12 are not added to the URL, but rather comprise the URL.

A TTL 1206 may control the length of time a payload is stored on the server 114. As an example, a TTL 1206 of "123011" may indicate the payload associated with the URL will be deleted from the server 114 on Dec. 30, 2011. An originator 1208 may indicate the device that originally provided the payload the URL is associated with to the server 114. As an example, an originator 1208 of "usera" may indicate User A originally provided the payload the URL is associated with. A payload size 1210 may indicate the size of a payload the URL is associated with. As an example, the payload size 1210 may be "2" indicating the payload is 2 MB. The media type 1212 may indicate the type of media of the payload associated with the URL. As an example, the media type 1212 may be "jpeg" indicating the payload is a JPEG. The targets 1214 may be a list of targets the URL may be sent to. As an example, targets 1214 of "usercuserd" may indicate the URL is intended for Users C and D. The action restriction 1216 may be a control placed on the actions which may be performed with the URL or may be an indication to the server 114 to prevent actions when the URL is received in a fetch command or upload request. As an example, an action restriction 1216 of "noforward" may be an indication to the server 114 to not allow the media payload associated with the URL to be forwarded to additional users if received in an upload request. The payload name 1218 may be a unique name assigned to the payload to distinguish it from other payloads. An id number 1220 may be a unique serialized number assigned to each URL as it is created to ensure every URL may be unique.

Figure 13:
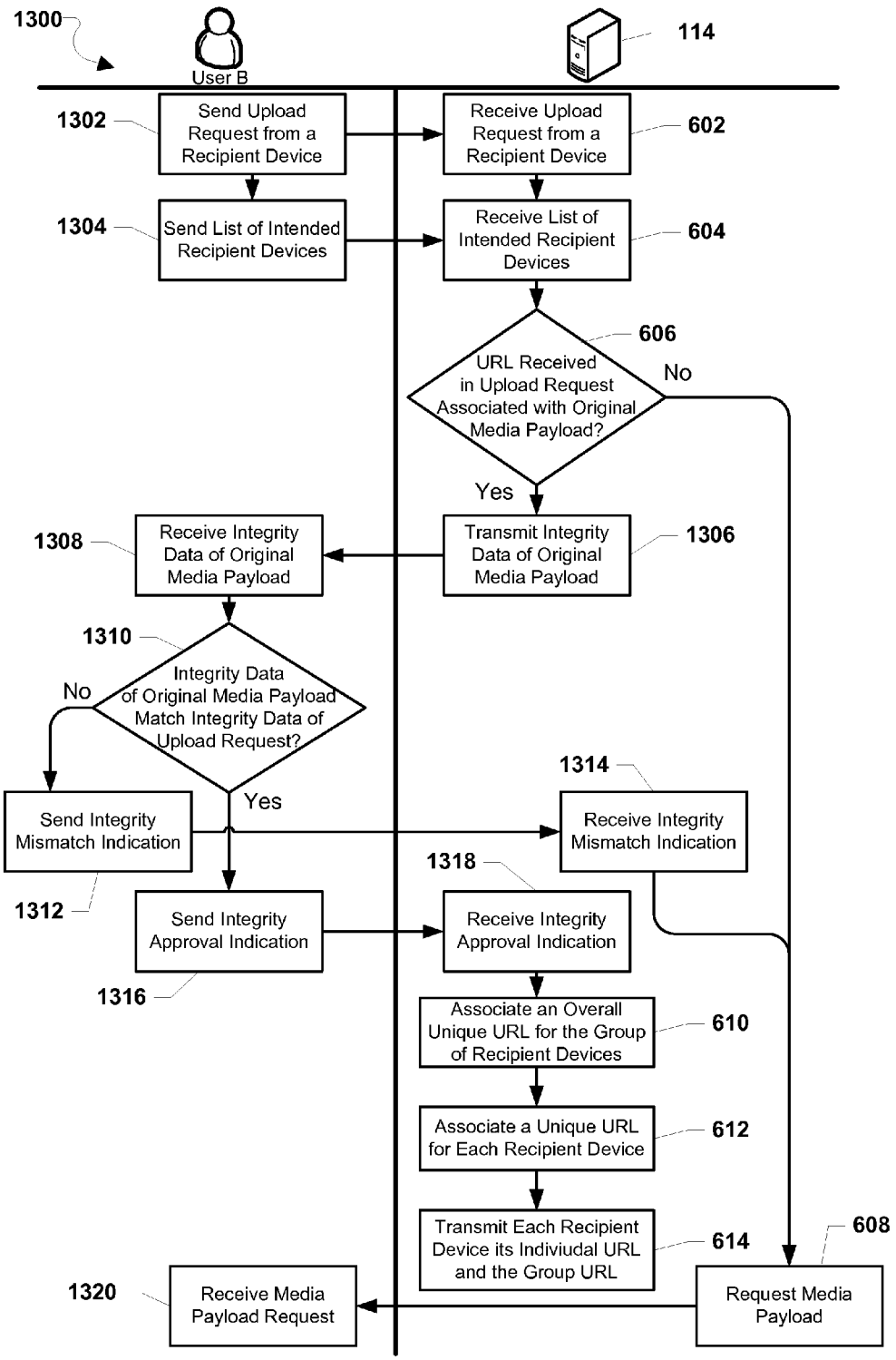
FIG. 13 is a process flow diagram illustrating an embodiment method for sharing media in a communication system.

FIG. 13 illustrates an embodiment method 1300 for sharing media between User B's recipient device and the server 114. At block 1302 User B may send an upload request from a recipient device associated with User B to the server 114. As discussed above, an upload request may include a URL previously received by User B. As an example, the upload request may be in the form of HTTP HEAD request including a URL. At block 1304 the recipient device of User B may send a list or intended recipient devices to the server 114. At blocks 602, 604, and 606 the server 114 may perform operations of method 600 described above with reference to FIG. 6. If the URL received in the upload request is not associated with the original media payload (i.e., determination block 606="No"), at block 608 the server 114 may send a request for the media payload to the recipient device of User B. At block 1320, the recipient device of User B may receive the media payload request.

If the URL received in the upload request is associated with the original media payload (i.e., determination block 606="Yes"), at block 1306 the server may transmit integrity data of the original media payload to the recipient device of User B. As an example, integrity data may an MD5 hash of the original media payload. At block 1308 the recipient device of User B may receive the integrity data of the original media payload. At determination block 1310 the recipient device of User B may determine if the integrity data of the original media payload matches the integrity data of the upload request. As an example, the recipient device of User B may compare a received MD5 hash of the original media payload to the MD5 hash of the media payload to be uploaded. In this manner the recipient device of User B may be able to determine if the media payload has been altered since the original media payload was uploaded. If the integrity data does not match (i.e., determination block 1310="No"), at block 1312 the recipient device of User B may send an integrity mismatch indication to the server 114. At block 1314 the server 114 may receive the integrity mismatch indication. At block 608 the server 114 may send a request for the media payload to the recipient device of User B. At block 1320, the recipient device of User B may receive the media payload request.

If the integrity data does match (i.e., determination block 1310="Yes"), at block 1316 the recipient device of User B may send an integrity approval indication to the server 114. At block 1318 the server 114 may receive the integrity approval indication. At blocks 610, 612, and 614, the server 114 may perform operations of method 600 described above with reference to FIG. 6.

Figure 14:
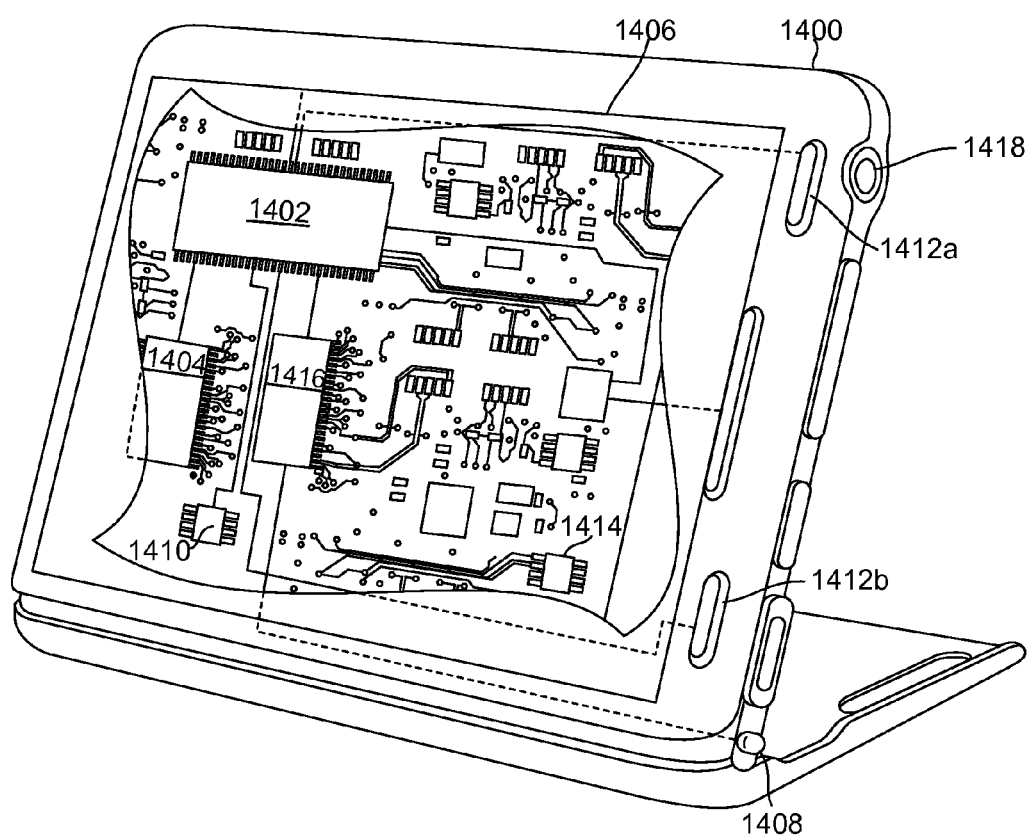
FIG. 14 is a component diagram of an example mobile computing device suitable for use with the various embodiments.

The various embodiments may be implemented in any of a variety of mobile devices, an example of which is illustrated in FIG. 14. For example, the mobile device 1400 may include a processor 1402 coupled to internal memories 1404 and 1410. Internal memories 1404 and 1410 may be volatile or non-volatile memories, and may also be secure and/or encrypted memories, or unsecure and/or unencrypted memories, or any combination thereof. The processor 1402 may also be coupled to a touch screen display 1406, such as a resistive-sensing touch screen, capacitive-sensing touch screen infrared sensing touch screen, or the like. Additionally, the display of the mobile device 1400 need not have touch screen capability. Additionally, the mobile device 1400 may have one or more antenna 1408 for sending and receiving electromagnetic radiation that may be connected to a wireless data link and/or cellular telephone transceiver 1416 coupled to the processor 1402. The mobile device 1400 may also include physical buttons 1412a and 1412b for receiving user inputs. The mobile device 1400 may also include a power button 1418 for turning the mobile device 1400 on and off.

Figure 15:
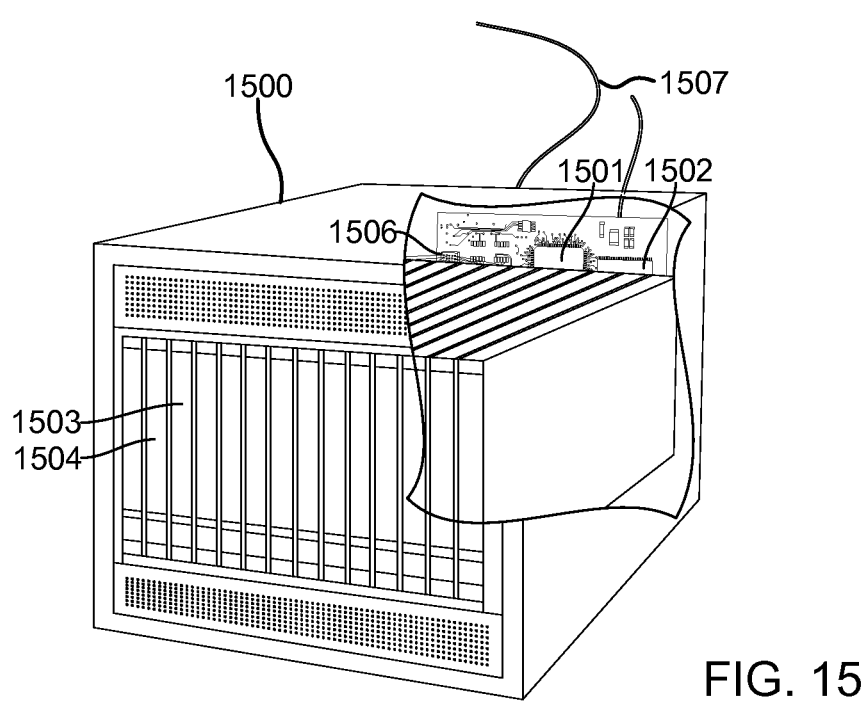
FIG. 15 is a component diagram of an example server suitable for use with the various embodiments.

The various embodiments may also be implemented on any of a variety of commercially available server devices, such as the server 1500 illustrated in FIG. 15. Such a server 1500 typically includes a processor 1501 coupled to volatile memory 1502 and a large capacity nonvolatile memory, such as a disk drive 1503. The server 1500 may also include a floppy disc drive, compact disc (CD) or DVD disc drive 1504 coupled to the processor 1501. The server 1500 may also include network access ports 1506 coupled to the processor 1501 for establishing network interface connections with a network 1507, such as a local area network coupled to other broadcast system computers and servers.

Figure 16:
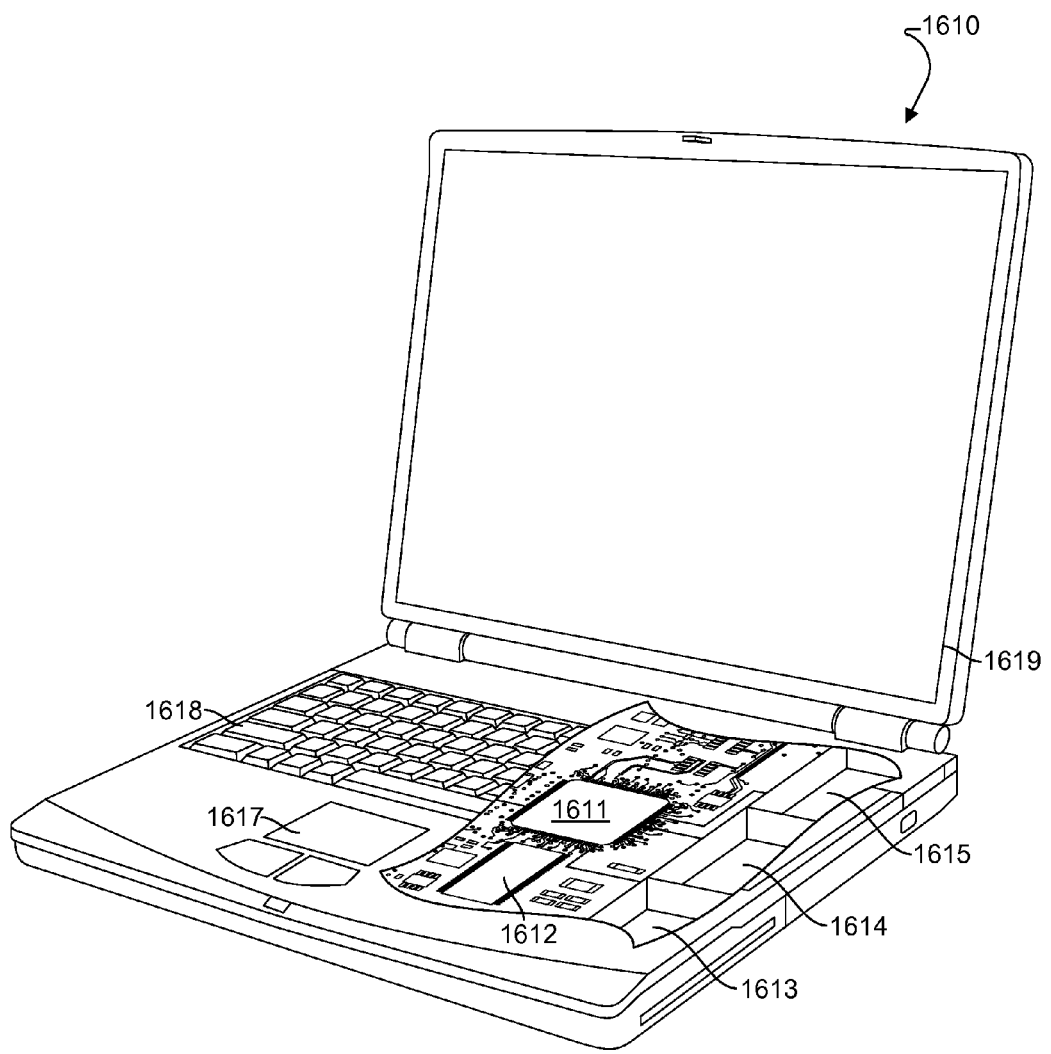
FIG. 16 is a component diagram of another example mobile computing device suitable for use with the various embodiments.

The various embodiments described above may also be implemented within a variety of personal computing devices, such as a laptop computer 1610 as illustrated in FIG. 16. Many laptop computers include a touch pad touch surface 1617 that serves as the computer's pointing device, and thus may receive drag, scroll, and flick gestures similar to those implemented on mobile computing devices equipped with a touch screen display and described above. A laptop computer 1610 will typically include a processor 1611 coupled to volatile memory 1612 and a large capacity nonvolatile memory, such as a disk drive 1613 of Flash memory. The computer 1610 may also include a floppy disc drive 1614 and a compact disc (CD) drive 1615 coupled to the processor 1611. The computer device 1610 may also include a number of connector ports coupled to the processor 1611 for establishing data connections or receiving external memory devices, such as a USB or FireWire® connector sockets, or other network connection circuits for coupling the processor 1611 to a network. In a notebook configuration, the computer housing includes the touchpad 1617, the keyboard 1618, and the display 1619 all coupled to the processor 1611. Other configurations of the computing device may include a computer mouse or trackball coupled to the processor (e.g., via a USB input) as are well known, which may also be use in conjunction with the various embodiments.

The processors 1402, 1501, and 1611 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1404, 1410, 1502, 1503, 1612, and 1613 before they are accessed and loaded into the processors 1402, 1501, and 1611. The processor 1402, 1501, and 1611 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1402, 1501, and 1611 including internal memory or removable memory plugged into the device and memory within the processors 1402, 1501, and 1611 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory server-readable medium or non-transitory processor-readable medium. The steps of a method or algorithm disclosed herein may be embodied in a processor-executable software module which may reside on a non-transitory computer-readable or processor-readable storage medium. Non-transitory server-readable or processor-readable storage media may be any storage media that may be accessed by a computer or a processor. By way of example but not limitation, such non-transitory server-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable and processor-readable media. Additionally, the operations of a method or algorithm may reside as one or any combination or set of codes and/or instructions on a non-transitory processor-readable medium and/or server-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for sharing media payloads between devices, comprising:
   receiving an original media payload from a first user device;
   receiving a list of intended recipient devices from the first user device, wherein the list of intended recipient devices is a group of recipient devices;
   storing the original media payload; associating an overall unique Uniform Resource Locator (URL) with a version of the media payload intended for the group of recipient devices;
   associating an individual unique URL with a version of the media payload intended for each recipient device; and
   transmitting each recipient device its individual unique URL and the overall unique URL.

2. The method of claim 1, wherein the URLs associated with the original media payload contain information related to an attribute of the original media payload or the first user device.

3. The method of claim 1, wherein the version of the media payload intended for each recipient device and the version of the media payload intended for the group of recipient devices are one of the media payload and a transcoded version of the media payload transcoded to be compatible with the recipient devices.

4. A method for sharing media payloads between devices, comprising: receiving in a server an original media payload from a first user device; receiving in the server a list of intended recipient devices from the first user device; storing the original media payload; associating a unique Uniform Resource Locator (URL) with a version of the media payload intended for each recipient device; transmitting each recipient device its unique URL; receiving in the server an upload request from one of the recipient devices including its unique URL and a list of new intended recipient devices; determining that the received unique URL is associated with the original media payload; associating a new unique URL with a version of the media payload intended for each new intended recipient device; and transmitting each new intended recipient device its new unique URL.

5. The method of claim 4, wherein the URLs associated with the version of the media payload intended for each recipient device contain information related to an attribute of the media payload or the first user device and the new unique URLs associated with the version of the media payload intended for each new recipient device contain information related to an attribute of the media payload or the one of the recipient devices.

6. The method of claim 4, wherein the version of the media payload intended for each recipient device and the version of the media payload intended for each new intended recipient device are one of the media payload and a transcoded version of the media payload transcoded to be compatible with the recipient devices or the new intend recipient devices.

7. The method of claim 4, wherein the server is a mobile device configured with processor-executable software compromising a server module.

8. A method for sharing media payloads between devices, comprising: receiving in a server an original media payload from a first user device; receiving in the server a list of intended recipient devices from the first user device; storing the original media payload; associating a first Uniform Resource Locator (URL) with the stored original media payload; determining a capability of at least one intended recipient device; transcoding the original media payload based on the determined capability of the at least one recipient device;

storing the transcoded media payload; associating a second URL with the stored transcoded media payload; transmitting the second URL to the at least one intended recipient device; receiving an upload request from the at least one intended recipient device including the transcoded media payload and a list of new intended recipient devices; determining if the media payload is still available; and transmitting the media payload to the new intended recipient devices in response to determining that the media payload is still available.

9. The method of claim 8, further comprising: receiving an indication of a capability enhancement from the at least one intended recipient device; determining an updated capability of the at least one intended recipient device; transcoding the media payload based on the determined updated capability of the at least one intended recipient device to create a newly transcoded media payload; storing the newly transcoded media payload; and transmitting the media payload or the newly transcoded media payload to the at least one intended recipient device.

10. The method of claim 8, wherein the first and second URLs contain information related to an attribute of the media payload, the first user device, or the transcoded media payload.

11. The method of claim 8, wherein the server is a mobile device configured with processor-executable software compromising a server module.

12. A method for sharing media payloads between devices, comprising: receiving an original media payload from a first user device; receiving an indication of a target user from the first user device; storing the original media payload; associating a Uniform Resource Locator (URL) with the original media payload; determining a plurality of devices associated with the target user; comparing a rate of user activity among the plurality of devices associated with the target user; transmitting the original media payload to a most active device of the plurality of devices associated with the target user; associating a unique URL with a version of the media payload intended for all other devices associated with the target user; and transmitting all other devices associated with the target user their unique URL.

13. The method of claim 12, wherein the comparing the rate of user activity among the plurality of devices associated with the target user comprises comparing a number of active connections with a server for each device of the plurality of devices.

14. The method of claim 12, wherein the comparing the rate of user activity among the plurality of devices associated with the target user comprises comparing the time at which each device of the plurality of devices associated with the target user last acknowledged or sent a message to a server.

15. The method of claim 12, wherein the comparing the rate of user activity among the plurality of devices associated with the target user comprises comparing the time at which each device of the plurality of devices associated with the target user registered with a server.

16. The method of claim 12, wherein the comparing the rate of user activity among the plurality of devices associated with the target user comprises comparing a rate of user interface activity among the plurality of devices associated with the target user.

17. A method for sharing media payloads between devices, comprising: receiving a media payload from a first user device; receiving an indication of a target user from the first user device; storing the media payload; associating a Uniform Resource Locator (URL) with the media payload; determining a plurality of devices associated with the target user; comparing a cost associated with downloading for each of the plurality of devices associated with the target user; transmitting the media payload to one of the plurality of devices associated with the target user with a lowest cost of downloading; associating a unique URL with a version of the media payload intended for all other devices associated with the target user; and transmitting to all other devices associated with the target user their unique URL.

18. The method of claim 17, wherein the comparing a cost associated with downloading for each of the plurality of devices associated with the target user comprises comparing a type of connection between each of the plurality of devices associated with the target user and a server.

19. A method for sharing media payloads between devices, comprising: receiving an original media payload from a first user device; receiving an indication of a target user from the first user device; storing the original media payload; associating a Uniform Resource Locator (URL) with the original media payload; determining a plurality of devices associated with the target user; comparing a quality of a link for each of the plurality of devices associated with the target user; transmitting the original media payload to one of the plurality of devices associated with the target user with a lowest cost of downloading; associating a unique URL with a version of the media payload intended for all other devices associated with the target user; and transmitting to all other devices associated with the target user their unique URL.

20. The method of claim 19, wherein the comparing a quality of a link for each of the plurality of devices associated with the target user comprises comparing the stability of each link between each of the plurality of devices associated with the target user and a server.

21. A non-transitory server-readable storage medium having stored thereon processor-executable instructions configured to cause a server to perform operations comprising: receiving an original media payload from a first user device; receiving a list of intended recipient devices from the first user device; storing the media payload; associating a unique Uniform Resource Locator (URL) with a version of the media payload intended for each recipient device; transmitting each recipient device its unique URL; receiving an upload request from one of the recipient devices including its unique URL and a list of new intended recipient devices; determining that the received unique URL is associated with the original media payload; associating a new unique URL with a version of the media payload intended for each new intended recipient device; and transmitting each new intended recipient device its new unique URL.

22. The non-transitory server-readable storage medium of claim 21, wherein the stored processor-executable instructions are configured to cause a server to perform operations such that the URLs associated with the version of the media payload intended for each recipient device contain information related to an attribute of the media payload or the first user device and the new unique URLs associated with the version of the media payload intended for each new recipient device contain information related to an attribute of the media payload or the one of the recipient devices.

23. The non-transitory server-readable storage medium of claim 21, wherein the stored processor-executable instructions are configured to cause a server to perform operations such that the version of the media payload intended for each recipient device and the version of the media payload intended for each new intended recipient device are one of the media payload and a transcoded version of the media payload transcoded to be compatible with the recipient devices or the new intend recipient devices.

24. A non-transitory server-readable storage medium having stored thereon processor-executable instructions configured to cause a server to perform operations comprising: receiving an original media payload from a first user device; receiving a list of intended recipient devices from the first user device; storing the media payload; associating a first Uniform Resource Locator (URL) with the stored media payload; determining a capability of at least one intended recipient device; transcoding the original media payload based on the determined capability of the at least one recipient device; storing the transcoded media payload; associating a second URL with the stored transcoded media payload; transmitting the second URL to the at least one intended recipient device; receiving an upload request from the at least one intended recipient device including the transcoded media payload and a list of new intended recipient devices; determining if the media payload is still available; and transmitting the media payload to the new intended recipient devices in response to determining that the media payload is still available.

25. The non-transitory server-readable storage medium of claim 24, wherein the stored processor-executable instructions are configured to cause a server to perform operations further comprising: receiving an indication of a capability enhancement from the at least one intended recipient device; determining an updated capability of the at least one intended recipient device; transcoding the media payload based on the determined updated capability of the at least one intended recipient device to create a newly transcoded media payload; storing the newly transcoded media payload; and transmitting the media payload or the newly transcoded media payload to the at least one intended recipient device.

26. The non-transitory server-readable storage medium of claim 24, wherein the stored processor-executable instructions are configured to cause a server to perform operations such that the first and second URLs contain information related to an attribute of the media payload, the first user device, or the transcoded media payload.

27. A non-transitory server-readable storage medium having stored thereon processor-executable instructions configured to cause a server to perform operations comprising: receiving a media payload from a first user device; receiving an indication of a target user from the first user device; storing the media payload; associating a Uniform Resource Locator (URL) with the original media payload; determining a plurality of devices associated with the target user; comparing a rate of user activity among the plurality of devices associated with the target user; transmitting the original media payload to a most active device of the plurality of devices associated with the target user; associating a unique URL with a version of the media payload intended for all other devices associated with the target user; and transmitting all other devices associated with the target user their unique URL.

28. The non-transitory server-readable storage medium of claim 27, wherein the stored processor-executable instructions are configured to cause a server to perform operations such that the comparing the rate of user activity among the plurality of devices associated with the target user comprises comparing a number of active connections with the server for each device of the plurality of devices.

29. The non-transitory server-readable storage medium of claim 27, wherein the stored processor-executable instructions are configured to cause a server to perform operations such that the comparing the rate of user activity among the plurality of devices associated with the target user comprises comparing the time at which each device of the plurality of devices associated with the target user last acknowledged or sent a message to the server.

30. The non-transitory server-readable storage medium of claim 27, wherein the stored processor-executable instructions are configured to cause a server to perform operations such that the comparing the rate of user activity among the plurality of devices associated with the target user comprises comparing the time at which each device of the plurality of devices associated with the target user registered with the server.

31. The non-transitory server-readable storage medium of claim 27, wherein the stored processor-executable instructions are configured to cause a server to perform operations such that the comparing the rate of user activity among the plurality of devices associated with the target user comprises comparing a rate of user interface activity among the plurality of devices associated with the target user.

32. A non-transitory server-readable storage medium having stored thereon processor-executable instructions configured to cause a server to perform operations comprising: receiving a media payload from a first user device; receiving an indication of a target user from the first user device; storing the media payload; associating a Uniform Resource Locator (URL) with the media payload; determining a plurality of devices associated with the target user; comparing a cost associated with downloading for each of the plurality of devices associated with the target user; transmitting the media payload to one of the plurality of devices associated with the target user with a lowest cost of downloading; associating a unique URL with a version of the media payload intended for all other devices associated with the target user; and transmitting to all other devices associated with the target user their unique URL.

33. The non-transitory server-readable storage medium of claim 32, wherein the stored processor-executable instructions are configured to cause a server to perform operations such that the comparing a cost associated with downloading for each of the plurality of devices associated with the target user comprises comparing a type of connection between each of the plurality of devices associated with the target user and the server.

34. A non-transitory server-readable storage medium having stored thereon processor-executable instructions configured to cause a server to perform operations comprising: receiving a media payload from a first user device; receiving an indication of a target user from the first user device; storing the media payload; associating a Uniform Resource Locator (URL) with the media payload; determining a plurality of devices associated with the target user; comparing a quality of a link for each of the plurality of devices associated with the target user; transmitting the original media payload to one of the plurality of devices associated with the target user with a lowest cost of downloading; associating a unique URL with a version of the media payload intended for all other devices associated with the target user; and transmitting to all other devices associated with the target user their unique URL.

35. The non-transitory server-readable storage medium of claim 34, wherein the stored processor-executable instructions are configured to cause a server to perform operations such that the comparing a quality of a link for each of the plurality of devices associated with the target user comprises comparing the stability of each link between each of the plurality of devices associated with the target user and the server.

36. A server, comprising: means for receiving a media payload from a first user device; means for receiving a list of intended recipient devices from the first user device, wherein the list of intended recipient devices is a group of recipient devices; means for storing the media payload; means for associating an overall unique Uniform Resource Locator (URL) with a version of the media payload intended for the group of recipient devices; means for associating an individual unique URL with a version of the media payload intended for each recipient device; and means for transmitting each recipient device its individual unique URL and the overall unique URL.

37. The server of claim 36, wherein the URLs associated with the original media payload contain information related to an attribute of the media payload or the first user device.

38. The server of claim 36, wherein the version of the media payload intended for each recipient device and the version of the media payload intended for the group of recipient devices are one of the media payload and a transcoded version of the media payload transcoded to be compatible with the recipient devices.

39. The server of claim 36, wherein the server is a mobile device configured with processor-executable software compromising a server module.

40. A server, comprising: means for receiving a media payload from a first user device; means for receiving a list of intended recipient devices from the first user device; means for storing the media payload; means for associating a unique Uniform Resource Locator (URL) with a version of the media payload intended for each recipient device; means for transmitting each recipient device its unique URL; means for receiving an upload request from one of the recipient devices including its unique URL and a list of new intended recipient devices; means for determining that the received unique URL is associated with the original media payload; means for associating a new unique URL with a version of the media payload intended for each new intended recipient device; and means for transmitting each new intended recipient device its new unique URL.

41. The server of claim 40, wherein the URLs associated with the version of the media payload intended for each recipient device contain information related to an attribute of the media payload or the first user device and the new unique URLs associated with the version of the media payload intended for each new recipient device contain information related to an attribute of the media payload or the one of the recipient devices.

42. The server of claim 40, wherein the version of the media payload intended for each recipient device and the version of the media payload intended for each new intended recipient device are one of the media payload and a transcoded version of the media payload transcoded to be compatible with the recipient devices or the new intend recipient devices.

43. The server of claim 40, wherein the server is a mobile device configured with processor-executable software compromising a server module.

44. A server, comprising: means for receiving a media payload from a first user device; means for receiving a list of intended recipient devices from the first user device; means for storing the media payload; means for associating a first Uniform Resource Locator (URL) with the stored media payload; means for determining a capability of at least one intended recipient device; means for transcoding the original media payload based on the determined capability of the at least one recipient device; means for storing the transcoded media payload; means for associating a second URL with the stored transcoded media payload; means for transmitting the second URL to the at least one intended recipient device; means for receiving an upload request from the at least one intended recipient device including the transcoded media payload and a list of new intended recipient devices; means for determining if the media payload is still available; and means for transmitting the media payload to the new intended recipient devices in response to determining that the media payload is still available.

45. The server of claim 44, further comprising: means for receiving an indication of a capability enhancement from the at least one intended recipient device; means for determining an updated capability of the at least one intended recipient device; means for transcoding the media payload based on the determined updated capability of the at least one intended recipient device to create a newly transcoded media payload; means for storing the newly transcoded media payload; and means for transmitting the media payload or the newly transcoded media payload to the at least one intended recipient device.

46. The server of claim 44, wherein the first and second URLs contain information related to an attribute of the media payload, the first user device, or the transcoded media payload.

47. The server of claim 44, wherein the server is a mobile device configured with processor-executable software compromising a server module.

48. A server, comprising: means for receiving a media payload from a first user device; means for receiving an indication of a target user from the first user device; means for storing the media payload; means for associating a Uniform Resource Locator (URL) with the original media payload; means for determining a plurality of devices associated with the target user; means for comparing a rate of user activity among the plurality of devices associated with the target user; means for transmitting the original media payload to a most active device of the plurality of devices associated with the target user; means for associating a unique URL with a version of the media payload intended for all other devices associated with the target user; and means for transmitting all other devices associated with the target user their unique URL.

49. The server of claim 48, wherein means for comparing the rate of user activity among the plurality of devices associated with the target user comprises means for comparing a number of active connections with the server for each device of the plurality of devices.

50. The server of claim 48, wherein means for comparing the rate of user activity among the plurality of devices associated with the target user comprises means for comparing the time at which each device of the plurality of devices associated with the target user last acknowledged or sent a message to the server.

51. The server of claim 48, wherein means for comparing the rate of user activity among the plurality of devices associated with the target user comprises means for comparing the time at which each device of the plurality of devices associated with the target user registered with the server.

52. The server of claim 48, wherein means for comparing the rate of user activity among the plurality of devices associated with the target user comprises means for comparing a rate of user interface activity among the plurality of devices associated with the target user.

53. The server of claim 48, wherein the server is a mobile device configured with processor-executable software compromising a server module.

54. A server, comprising: means for receiving a media payload from a first user device; means for receiving an indication of a target user from the first user device; means for storing the media payload; means for associating a Uniform Resource Locator (URL) with the media payload; means for determining a plurality of devices associated with the target user; means for comparing a cost associated with downloading for each of the plurality of devices associated with the target user; means for transmitting the media payload to one of the plurality of devices associated with the target user with a lowest cost of downloading; means for associating a unique URL with a version of the media payload intended for all other devices associated with the target user; and means for transmitting to all other devices associated with the target user their unique URL.

55. The server of claim 54, wherein means for comparing a cost associated with downloading for each of the plurality of devices associated with the target user comprises means for comparing a type of connection between each of the plurality of devices associated with the target user and the server.

56. The server of claim 54, wherein the server is a mobile device configured with processor-executable software compromising a server module.

57. A server, comprising: means for receiving a media payload from a first user device; means for receiving an indication of a target user from the first user device; means for storing the media payload; means for associating a Uniform Resource Locator (URL) with the media payload; means for determining a plurality of devices associated with the target user; means for comparing a quality of a link for each of the plurality of devices associated with the target user; means for transmitting the original media payload to one of the plurality of devices associated with the target user with a lowest cost of downloading; means for associating a unique URL with a version of the media payload intended for all other devices associated with the target user; and means for transmitting to all other devices associated with the target user their unique URL.

58. The server of claim 57, wherein means for comparing a quality of a link for each of the plurality of devices associated with the target user comprises means for comparing the stability of each link between each of the plurality of devices associated with the target user and the server.

59. The server of claim 57, wherein the server is a mobile device configured with processor-executable software compromising a server module.

60. A server, comprising: a memory; and a processor, wherein the processor is configured with processor-executable instructions to perform operations comprising: receiving a media payload from a first user device; receiving a list of intended recipient devices from the first user device, wherein the list of intended recipient devices is a group of recipient devices; storing the media payload; associating an overall unique Uniform Resource Locator (URL) with a version of the media payload intended for the group of recipient devices; associating an individual unique URL with a version of the media payload intended for each recipient device; and transmitting each recipient device its individual unique URL and the overall unique URL.

61. The server of claim 60, wherein the processor is configured with processor-executable instructions to perform operations such that the URLs associated with the original media payload contain information related to an attribute of the media payload or the first user device.

62. The server of claim 60, wherein the processor is configured with processor-executable instructions to perform operations such that the version of the media payload intended for each recipient device and the version of the media payload intended for the group of recipient devices are one of the media payload and a transcoded version of the media payload transcoded to be compatible with the recipient devices.

63. The server of claim 60, wherein the server is a mobile device configured with processor-executable software compromising a server module.

64. A server, comprising: a memory; and a processor, wherein the processor is configured with processor-executable instructions to perform operations comprising: receiving a media payload from a first user device; receiving a list of intended recipient devices from the first user device; storing the media payload; associating a unique Uniform Resource Locator (URL) with a version of the media payload intended for each recipient device; transmitting each recipient device its unique URL; receiving an upload request from one of the recipient devices including its unique URL and a list of new intended recipient devices; determining that the received unique URL is associated with the original media payload; associating a new unique URL with a version of the media payload intended for each new intended recipient device; and transmitting each new intended recipient device its new unique URL.

65. The server of claim 64, wherein the processor is configured with processor-executable instructions to perform operations such that the URLs associated with the version of the media payload intended for each recipient device contain information related to an attribute of the media payload or the first user device and the new unique URLs associated with the version of the media payload intended for each new recipient device contain information related to an attribute of the media payload or the one of the recipient devices.

66. The server of claim 64, wherein the processor is configured with processor-executable instructions to perform operations such that the version of the media payload intended for each recipient device and the version of the media payload intended for each new intended recipient device are one of the media payload and a transcoded version of the media payload transcoded to be compatible with the recipient devices or the new intend recipient devices.

67. The server of claim 64, wherein the server is a mobile device configured with processor-executable software compromising a server module.

68. A server, comprising: a memory; and a processor, wherein the processor is configured with processor-executable instructions to perform operations comprising: receiving a media payload from a first user device; receiving a list of intended recipient devices from the first user device; storing the media payload; associating a first Uniform Resource Locator (URL) with the stored media payload; determining a capability of at least one intended recipient device; transcoding the original media payload based on the determined capability of the at least one recipient device; storing the transcoded media payload; associating a second URL with the stored transcoded media payload; transmitting the second URL to the at least one intended recipient device; receiving an upload request from the at least one intended recipient device including the transcoded media payload and a list of new intended recipient devices; determining if the media payload is still available; and transmitting the media payload to the new intended recipient devices in response to determining that the media payload is still available.

69. The server of claim 68, wherein the processor is configured with processor-executable instructions to perform operations further comprising: receiving an indication of a capability enhancement from the at least one intended recipient device; determining an updated capability of the at least one intended recipient device; transcoding the media payload based on the determined updated capability of the at least one intended recipient device to create a newly transcoded media payload; storing the newly transcoded media payload; and transmitting the media payload or the newly transcoded media payload to the at least one intended recipient device.

70. The server of claim 68, wherein the processor is configured with processor-executable instructions to perform operations such that the first and second URLs contain information related to an attribute of the media payload, the first user device, or the transcoded media payload.

71. The server of claim 68, wherein the server is a mobile device configured with processor-executable software compromising a server module.

72. A server, comprising: a memory; and a processor, wherein the processor is configured with processor-executable instructions to perform operations comprising: receiving a media payload from a first user device; receiving an indication of a target user from the first user device; storing the media payload; associating a Uniform Resource Locator (URL) with the original media payload; determining a plurality of devices associated with the target user; comparing a rate of user activity among the plurality of devices associated with the target user; transmitting the original media payload to a most active device of the plurality of devices associated with the target user; associating a unique URL with a version of the media payload intended for all other devices associated with the target user; and transmitting all other devices associated with the target user their unique URL.

73. The server of claim 72, wherein the processor is configured with processor-executable instructions to perform operations such that the comparing the rate of user activity among the plurality of devices associated with the target user comprises comparing a number of active connections with the server for each device of the plurality of devices.

74. The server of claim 72, wherein the processor is configured with processor-executable instructions to perform operations such that the comparing the rate of user activity among the plurality of devices associated with the target user comprises comparing the time at which each device of the plurality of devices associated with the target user last acknowledged or sent a message to the server.

75. The server of claim 72, wherein the processor is configured with processor-executable instructions to perform operations such that the comparing the rate of user activity among the plurality of devices associated with the target user comprises comparing the time at which each device of the plurality of devices associated with the target user registered with the server.

76. The server of claim 72, wherein the processor is configured with processor-executable instructions to perform operations such that the comparing the rate of user activity among the plurality of devices associated with the target user comprises comparing a rate of user interface activity among the plurality of devices associated with the target user.

77. The server of claim 72, wherein the server is a mobile device configured with processor-executable software compromising a server module.

78. A server, comprising:
a memory; and
a processor, wherein the processor is configured with processor-executable instructions to perform operations comprising:
receiving a media payload from a first user device; receiving an indication of a target user from the first user device; storing the media payload;
associating a Uniform Resource Locator (URL) with the media payload; determining a plurality of devices associated with the target user; comparing a cost associated with downloading for each of the plurality of devices associated with the target user; transmitting the media payload to one of the plurality of devices associated with the target user with a lowest cost of downloading;
associating a unique URL with a version of the media payload intended for all other devices associated with the target user; and transmitting to all other devices associated with the target user their unique URL.

79. The server of claim 78, wherein the processor is configured with processor-executable instructions to perform operations such that the comparing a cost associated with downloading for each of the plurality of devices associated with the target user comprises comparing a type of connection between each of the plurality of devices associated with the target user and the server.

80. The server of claim 78, wherein the server is a mobile device configured with processor-executable software compromising a server module.

81. A server, comprising:
a memory; and
a processor, wherein the processor is configured with processor-executable instructions to perform operations comprising: receiving a media payload from a first user device; receiving an indication of a target user from the first user device;
storing the media payload; associating a Uniform Resource Locator (URL) with the media payload; determining a plurality of devices associated with the target user; comparing a quality of a link for each of the plurality of devices associated with the target user;
transmitting the original media payload to one of the plurality of devices associated with the target user with a lowest cost of downloading; associating a unique URL with a version of the media payload intended for all other devices associated with the target user; and
transmitting to all other devices associated with the target user their unique URL.

82. The server of claim 81, wherein the processor is configured with processor-executable instructions to perform operations such that the comparing a quality of a link for each of the plurality of devices associated with the target user comprises comparing the stability of each link between each of the plurality of devices associated with the target user and the server.

83. The server of claim 81, wherein the server is a mobile device configured with processor-executable software compromising a server module.

* * * * *